United States Patent
Matsuda

(10) Patent No.: US 7,086,005 B1
(45) Date of Patent: Aug. 1, 2006

(54) SHARED VIRTUAL SPACE CONVERSATION SUPPORT SYSTEM USING VIRTUAL TELEPHONES

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 09/714,637

(22) Filed: Nov. 16, 2000

(30) Foreign Application Priority Data

Nov. 29, 1999 (JP) .............................. P11-337105

(51) Int. Cl.
*G06F 15/00* (2006.01)
(52) U.S. Cl. .................. 715/706; 715/853; 715/854
(58) Field of Classification Search ................ 345/757, 345/758; 455/422, 517, 550; 715/763, 765, 715/853, 854, 706; 709/209, 210; 713/853, 713/706, 854, 765
See application file for complete search history.

(56) References Cited

U.S. PATENT DOCUMENTS

| | | | | |
|---|---|---|---|---|
| 5,682,469 A | * | 10/1997 | Linnett et al. | 345/473 |
| 5,880,731 A | * | 3/1999 | Liles et al. | 345/758 |
| 6,054,996 A | * | 4/2000 | Bardon et al. | 345/619 |
| 6,208,724 B1 | * | 3/2001 | Fritzinger et al. | 379/201.01 |
| 6,219,045 B1 | * | 4/2001 | Leahy et al. | 715/757 |
| 6,397,080 B1 | * | 5/2002 | Viktorsson et al. | 455/558 |
| 6,484,037 B1 | * | 11/2002 | Schmidt et al. | 455/514 |

FOREIGN PATENT DOCUMENTS

FI 0797338 A2 * 9/1997

OTHER PUBLICATIONS

Andy Smith, Venue- Adding 3D Visualization Capabilities to GIS, Mar. 8, 1998, pp. 1-3 and picture on p. 4.*

* cited by examiner

*Primary Examiner*—Cao (Kevin) Nguyen
(74) *Attorney, Agent, or Firm*—Oblon, Spivak, McClelland, Maier & Neustadt, P.C.

(57) ABSTRACT

A conversation support system and a conversation support method for providing a realtime communications environment in which a plurality of users simultaneously participate in a virtual world built and provided on a computer network for realtime talking. A shared virtual space accommodates remote communications infrastructures such as mobile telephone, PHS, and public telephone. Avatars can have a talk with each other by use of these infrastructures regardless of the locations of the communicating avatars, namely regardless of whether each avatar is inside or outside its aura. Namely, the avatars can communicate each other beyond a single shared virtual world. The PHS owned by each avatar can communicate with any PHS in another virtual world or even in the real world.

17 Claims, 14 Drawing Sheets

SHARED VIRTUAL SPACE CONVERSATION SUPPORT SYSTEM USING VIRTUAL TELEPHONES

BACKGROUND OF THE INVENTION

The present invention relates generally to a conversation support system and a conversation support method for supporting a virtual conversational environment in which a plurality of users can participate, the system and the method being built and provided on a computer network such as the Internet. More especially, the present invention relates to a conversation support system and a conversation support method for supporting a virtual conversational environment in which a plurality of users can participate in a virtual world having a predetermined spatial expanse built on a computer network.

To be more specific, the present invention relates to a conversation support system and a conversation support method for allowing users to communicate with each other without actually meeting each other in a shared virtual world having a spatial expanse built on a computer network and, more particularly, to a conversation support system and a conversation support method for allowing users to communicate with each other in virtual worlds beyond the framework of a single shared virtual world.

Recently, remarkable advances in computing technologies in information processing and information communication have been made and, on the basis thereof, computer systems have become widespread. Also, demands for network computing technologies for interconnecting computers have been growing. On networks, users of computers can smoothly share computer resources and share, distribute and exchange information. In addition, computer users can carry out collaborative work on their computers interconnected by networks.

Computers are interconnected by various types of networks. For example, these networks include LANs (Local Area Networks) such as Ethernet and Bluetooth, a WAN (Wide Area Network) formed by interconnecting LANs by leased lines for example, and the Internet which has grown to a worldwide network as a result of repeatedly interconnecting smaller networks.

The Internet is a network which has evolved from the ARPANET (Advanced Research Projects Agency Network) built by the U.S. Department of Defense. From the ARPANET, the Internet was then included in NSFNET (National Science Foundation Network) of U.S. National Science Foundation. Further, with the backbone of NSFNET transferred to nongovernment organizations in 1995, the fully fledged expansion known today of the Internet started. The Internet has grown to the today's gigantic network as a result of the repetition of autonomous interconnections of servers (mainly UNIX workstations) installed in universities and research organizations. The servers on the Internet are interconnected normally on the basis of TCP/IP (Transmission Control Protocol/Internet Protocol). Currently, millions of servers are connected to the Internet, each server making public its various resource objects to countless clients.

On the Internet, many services such as the WWW (World Wide Web), News, TELNET (TELetypewriter NETwork), FTP (File Transfer Protocol), and Gopher for example are provided for the general public. Of these services, WWW is a worldwide information search system providing an information space having a hyperlink structure and the main factor for the explosive growth and fast popularization of the Internet.

The WWW, invented by Tim Bernes-Lee at CERN (European Center for Nuclear Research) of Switzerland, is a worldwide information search system that allows accessing various media such as text, image, and voice in the form of hypertext. The hypertext information handled on the WWW is described in a hypertext description language called HTML (Hyper Text Markup Language). According to HTML-based hypertext description, the logical structure of document can be expressed by formatting delimited basically by "<" and ">". A protocol used for transferring HTML files on TCP/IP networks is called HTTP (Hyper Text Transfer Protocol).

Currently, countless number of HTML documents, namely information resources, are presented with and without charge on the Internet. According to TCP/IP, various information resources including these HTML documents are identified by identifiers having a format called URL (Uniform Resource Locators). A URL is character string specifying means for accessing an information resource and the name thereof and described in the form of "scheme name (protocol name)://host name (domain name): port number/pass number (file name)". An HTML document can include a link relationship with another information source, the link information also being specified in the form of URL.

The WWW is a system constructed in a client-server model. A WWW server is a computer system that operates server software called an HTTP daemon and stores and/or provides information resources described in HTML form (the daemon generically denotes programs that execute system management and processing in the background in UNIX environment).

A WWW client is a computer which operates by use of a user agent called a WWW browser or an HTML browser. Typical WWW browsers are "Netscape Navigator" of Netscape Communications and "Internet Explorer" of Microsoft Corp.

A WWW client user can specify desired information resources by entering a URL character string into a location box on a WWW browser screen. Normally, a WWW browser accesses or retrieves information resources on WWW servers in accordance with HTTP (Hyper Text Transfer Protocol). Besides, a WWW browser analyzes a retrieved HTML document and displays its contents on the browser window screen (namely, a home page is constructed on the browser screen). On a WWW page displayed on the browser screen, link information is indicated as "anchor". The user clicks this anchor can specify an information resource of next reference destination. That is, via a WWW browser screen, the user searches a WWW information resource space in which hyper links are woven on the Internet to sequentially access various desired information resources.

In addition to the WWW, various applications such as BBS (Bulletin Board System) and chatting are available on the Internet.

A BBS is a system by which computerized bulletin information is accumulated on a server on a network and the accumulated information is made available for the viewing by users through the network. A BBS allows the centralized management of information on a server and the realtime exchanging of information between remotely distributed users.

Chatting is an online talking system which allows realtime conversation between users through keyboard inputted words via a network. Normally, two or more users log in a chat for a simultaneous talk in which remarks made by one user are displayed on the monitor screens of all users. Chatting allows remotely distributed users to make realtime conversation and discussion in a virtual world constructed on the Internet. Only logging in a virtual world provided by a chatting system instantly qualifies users to join a chat session. Besides, the users participating in a chat session need not be known by sight in the real world. These are major advantages of chatting. While the interaction by BBS is asynchronous, the conversation by chat is synchronous and therefore each participant can make remarks while checking the reactions of chatting mates, which makes the communication livelier than BBS.

For example, a cyberspace service named Habitat (trademark) is known in the so-called personal computer communications services. Development of Habitat started in 1985 by Lucas Film of the US, operated by Quantum Link, one of US commercial networks, for about three years. Then, Habitat started its service in NIFTY-Serve as Fujitsu Habitat (trademark) in February 1990.

In Habitat, users can send their alter egos called avatars (the incarnation of a god figuring in the Hindu mythology) into a virtual city called Populopolis drawn by two-dimensional graphics to have a chat (namely, a realtime conversation based on text entered and displayed) with each other. For further details of Habitat, refer to the Japanese translation of "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010, pp. 282–307.

Meanwhile, the information resources handled on the Internet were initially nothing but two-dimensional, flat representations. For example, the HTML documents handled on the WWW system only describe two-dimensional information. Therefore, the HTML content displayed on an HTML browser screen, or a home page screen, is nothing but two-dimensional, flat representation.

In the conventional cyberspace systems operated by personal computer communications services such as mentioned above, a virtual reality street and the inside of a room for example are drawn in two-dimensional graphics. Therefore, moving an avatar in the depth direction is realized simply by moving it up and down in the background of the two-dimensional graphics. This results in a poor expression in simulating walking and movement in a virtual reality space. Also, the two-dimensional virtual reality space in which own avatar and the avatar of another user are displayed is viewed from a viewpoint of a third party, thereby impairing the sense of simulated experience.

On the other hand, VRML (Virtual Reality Modeling Language) was developed as a language to enable the description of three-dimensional information and the setting of hypertext links for objects drawn by three-dimensional graphics by extending the WWW. VRML allows to handle the appearance (for example, a lighting condition) and geometry of a three-dimensional object as data. In addition, VRML can assign a name to an object to describe the action of the name in a Java programming language.

VRML 1.0 allows mainly the still object representations in which a three-dimensional object changes in response to a mouse operation by the user. VRML 2.0, for which the specifications based on "moving world" were made public, adds three-dimensional object autonomous behavior, animation mapping, audio data handling, interactive representations for example. Details of VRML are disclosed in the Japanese translation of "VRML: Browsing & Building Cyberspace," Mark Pesce, 1995, New Readers Publishing, ISBN1-56205-498-8, the translation being entitled "Getting to Know VRML: Building and Browsing Three-Dimensional Cyberspace," translated by Kouichi Matsuda, Teruhisa Kamachi, Akikazu Takeuchi, Yasuaki Honda, Junichi Rekimoto, Masayuki Ishikawa, Ken Miyashita and Kazuhiro Hara, published Mar. 25, 1996, Prentice Hall, ISBN4-931356-37-0 for example.

The official and complete specifications of VRML 2.0 are publicized at "http://webspace.sgi.com/moving-worlds/spec/index.html" and the Japanese version thereof is publicized at "http://www.webcity.co.jp/info/andoh/VRML/vrml2.0/spec-jp/index.html."

Construction of a three-dimensional virtual space by use of VRML 2.0 requires to only create a VRML file as follows:

(1) create graphic data indicative of the geometry, motion, and position of an object (or a model) in the virtual space (this process is called modeling);

(2) add a switch (or a sensor) to the model for generating an event in response to a mouse operation by user in which the user clicks the model in the displayed virtual space (this process is called sensor addition);

(3) program a script for realizing an event in response to the operation by user on the sensor (this processing is called scripting); and (4) relate sensor operation with script activation and graphic data with the script (this processing is called routing).

VRML content can be accessed by use of a VRML browser. Namely, desired VRML content can be read from a WWW resource space on the Internet to be displayed through a VRML browser. The user can roam about in the displayed three-dimensional space by use of a pointing device such as a mouse. As the user moves in the displayed three-dimensional space, the displayed screen changes realtime to a scene viewed from each moving position. Movement in a narrow range is displayed by re-computing the three-dimensional data on the client side. A hypertext link may be set to an object (for example, a cuboid or a column) drawn by use of three-dimensional graphics. Namely, the user can search a three-dimensionally displayed screen with a mouse cursor to reach another item of VRML content or HTML content by clicking an anchor displayed represented in a three-dimensional object.

For example, VRML allows the description of a three-dimensional shared virtual space to be shared by two or more users. The above-mentioned chatting was initially a system by which words inputted by participants through their keyboards are only sequentially recorded. Also, the cyberspaces were initially nothing more than two-dimensional graphic representations. Recently, however, a three-dimensional chatting system has appeared in which participants have conversations a three-dimensional virtual space, providing a place of communication in a shared virtual society abounding with realistic touches built and provided on the Internet.

A three-dimensional shared virtual space is described in VRML and can be downloaded from a WWW server through the Internet for example. Each participant who logs in a shared virtual space is allocated with an avatar, which is equivalent to the alter ego of the user. The avatar is a type of an application object generated by an application program. Information (for example, current position, attire, name, and gender) about each avatar in a shared virtual space is shared among the log-in users, so that the avatars of own and other users appear on the monitor screen of each user. Each user can make his avatar search the shared virtual space as if the user himself searched the real world. Remarks inputted by a user through the keyboard are displayed on the monitor screen of all participating users in the form of a speech balloon popping up from the avatar of the remarking user.

Three-dimensional shared virtual worlds can visually attract more users than old-fashioned chatting systems in which remarks made by users are only displayed in text in a time series manner. Each three-dimensional shared virtual space also allows users to check realtime the reactions of others through three-dimensional graphical representation, thereby making conversations livelier. The participating users can share virtual or pseudo experiences such as events that take place in the shared virtual world. In addition, the participating users can execute game-like interactive operations such as searching for other avatars or escaping from them in the three-dimensional space. Further, introduction of time mechanisms for providing day and night and seasons for example and other changes simulating the real world enhances the sense of virtual reality, thereby providing a user-friendly environment in each shared virtual space.

U.S. Pat. No. 5,956,038 (equivalent to Japanese Patent Laid-open No. Hei 9-81781) assigned to the applicant hereof for example discloses a three-dimensional virtual reality space system in which users can roam about by use of the viewpoints of their avatars in a three-dimensionally expressed shared virtual space. This shared virtual space can be described by use of a VRML description language.

Each three-dimensional shared virtual space is high computerized and therefore, as compared with a physical real world, virtual social infrastructures can be built more easily by computer processing. For example, a calling card system by which calling cards and other information are exchanged among avatars, a distribution system (for example, virtual shop, virtual currency, and virtual barter), a virtual space mailing system may be introduced (for example, Japanese Patent Laid-open No. Hei 11-203009 assigned to the applicant hereof equivalent to U.S. application for patent Ser. No. 09/227,689 discloses the introduction of calling cards in a shared virtual space.) Namely, passing a calling card to the virtual creature object bred by a user not accessing the shared virtual spaces can realize communication between users. Further, the three-dimensional shared virtual space can extend the activity radius of each avatar and expand a shared virtual space to accommodate more log-in users, or avatars.

As described, positional information and other information associated with avatars existing in a shared virtual space is shared by the log-in users, each user being capable of observing the avatars of own and other users on the monitor screen. However, distribution of the information about an expansive shared virtual space in its entirety to users is difficult or impracticable due to such physical constraints in the Internet as line bandwidth. The distance between avatars implies the degree of interest and intimacy between users and therefore the information about avatars separated far away from own avatar may be unnecessary for that user to have.

Consequently, a so-called aura algorithm scheme is employed in which, generally, only the information inside an area of interest, namely an aura, is transferred to each user, the information outside the aura being prevented from distribution. Generally, an aura is defined on the basis of the current position of an avatar. For the details of the aura algorithm, refer to, for example, Beford, S., and Fahlen, L., "A Spacial Model of Interaction in Large Virtual Environments," Proc. Of G. DeMichelis et al. (Eds.), Third European Conference on Computer Supported Cooperative Work, Kluwer Academic Publishers, pp. 109–124, 1993.

Introducing the concept of aura into a shared virtual society can reduce the volume of data to be distributed to each user, at cost that communication with users outside that aura is disabled because the extra-aura information is not transferred to the users inside the aura.

An avatar symbolizing each user is living in a shared virtual space while almost always moving, chasing or escaping other avatars for example. Therefore, the supply of information about an avatar getting outside the aura is discontinued and, if this happens, there is no way of communicating with it.

To overcome this drawback, a virtual communications infrastructure called "mobile phone" is introduced in a shared virtual space to acquire a method of communicating with avatars outside the aura or remotely separated avatars. This method allows each avatar, regardless of inside or outside the aura, can establish communication with others by dialing their mobile phones. In the real world also, the telephone denotes a device for supporting realtime communication between remotely separated users. In having conversations by use of virtual mobile phones, an avatar need not at all bring a mate avatar into the own aura. The virtual mobile phone also allows direct communication with avatars which are missing inside the aura.

The virtual mobile phone introduced in a shared virtual space (hereafter also referred to as a virtual telephone) not only realizes one-to-one realtime communication between avatars in the same shared virtual space but also may have the basic features of the mobile phone of the real world. For example, these features include a telephone directory capability by which the names and telephone numbers are registered beforehand and only a registered name need to be selected for dialing, an incoming call rejection directory capability by which specific users are registered beforehand to reject the receipt of their calls, and a nuisance call rejection capability by which the calls from the specified users registered in the incoming call rejection directory are rejected.

Use of the virtual telephone makes it unnecessary for each avatar to remain inside its aura to establish communication with each other. Namely, use of the virtual telephone allows each user to communicate with avatars which is outside the aura or the monitor screen, thereby making it unnecessary for each user to search the immense virtual shared space for companionship with other avatars or users.

If avatars make an agreement for meeting some day in the shared virtual space, the possibility of the reunion is low unless the place and time of the meeting are set. Use of the virtual telephone eliminates this necessity for the place and time setting because the avatars equipped with the virtual telephone only need to be exist in the same shared virtual space at the same time. In addition, the virtual telephone makes it unnecessary for each user to make a direct, face-to-face contact with the avatar of another user for passing a message.

Originally, the telephone is for remote communication. Therefore, some users want to make avatar communication not only inside a single virtual space, but also with other virtual spaces and even with the real world.

For example, a user who cannot log in a chat system, namely cannot enter a shared virtual space, due to some urgent business or the like may want to talk with another avatar, namely a user who is logging in the chat system. In another example, if the avatar of another user does not appear in a shared virtual space at an appointed time, namely the user of that avatar is not logging in the chat system, the mate user may want to send a message to that log-off user.

A virtual shared space itself is constructed in a distributed computing environment such as the Internet in which many computers are networked. A gateway to another world beyond a single virtual space is obviously desired by its users.

SUMMARY OF THE INVENTION

It is therefore an object of the present invention to provide a conversation support system and a conversation support method that allow two or more users to simultaneously participate, for realtime communication, in a virtual world having a predetermined spatial expanse built on a computer network such as the Internet.

It is another object of the present invention to provide a conversation support system and a conversation support method that allow users to communicate each other without making a face-to-face meeting in a shared virtual world having a spatial expanse built on a computer network.

It is still another object of the present invention to provide a conversation support system and a conversation support method that allow users to communicate each other beyond a single shared virtual world.

It is yet another object of the present invention to provide a conversation support system and a conversation support method that allow users to communicate each other even if one of users between whom communication is to be established is not in a shared virtual world having a spatial expanse built on a computer network.

In carrying out the invention and according to a first aspect thereof, there is provided a conversation support system or method for supporting a plurality of users in having a virtual conversation in a shared virtual space built and provided on a computer network, comprising: enrolling means or step for enrolling an avatar of a log-in user into the shared virtual space; imparting means or step for imparting a virtual mobile telephone to each avatar in the shared virtual space, the virtual mobile telephone being usable therein; determination means or step for determining, in response to a call from the virtual mobile telephone, whether a calling party who originated the call exists in the shared virtual space; and connecting means or step for executing connection processing in accordance with a decision made by the determination means.

If the calling party originated the call from a telephone in real world, the connecting means or step establishes connection with the calling party through a public telephone network in real world and/or executes message transfer.

If the calling party originated the call from a telephone in another virtual space, the connecting means or step establishes connection with the telephone in another virtual space and/or executes message transfer.

The connecting means or step receives the call from the telephone in real world and/or the telephone in another virtual space and connects the received call to a virtual mobile telephone of a called avatar in the shared virtual space. In this case, when the call comes from the telephone in real world or the telephone in another virtual space, it is determined whether this call is addressed to an avatar existing in the shared virtual space. If the decision is affirmative, the call is connected to the virtual telephone of that avatar.

In carrying out the invention and according to a second aspect thereof, there is provided a conversation support system or method for supporting a plurality of users in having a virtual conversation in a shared virtual space built and provided on a computer network, comprising: enrolling means or step for enrolling an avatar of a log-in user into the shared virtual space; imparting means or step for imparting a virtual public telephone usable by any enrolled avatar to the shared virtual space at a predetermined place; determination means or step for determining, in response to a call from the virtual public telephone, whether a calling party who originated the call exists in the shared virtual space; and connecting means or step for executing connection processing in accordance with a decision made by the determination means.

If the calling party originated the call from a telephone in real world, the connecting means or step establishes connection with the calling party through a public telephone network in real world and/or executes message transfer.

If the caller originated the call from a telephone in another virtual space, the connecting means or step establishes connection with the telephone in another virtual space and/or executes message transfer.

In carrying out the invention and according to a third aspect thereof, there is provided a conversation support method for supporting an activity of an avatar in a shared virtual space built and provided on a computer network, comprising the steps of: receiving a request for sending a message from the avatar; determining whether a destination of the message exists in the shared virtual space; and executing connection processing in accordance with a decision made by the determining step.

If the destination of the message is found in real world, the connecting step establishes connection with the destination through a public telephone network in real world and/or executes message transfer.

In carrying out the invention and according to a fourth aspect thereof, there is provided a conversation support method for supporting an activity of an avatar in a shared virtual space built and provided on a computer network, comprising the steps of: receiving a request for sending a message from a source in real space through a public telephone network in real world; determining whether a destination of the message exists in the shared virtual space; and if a decision made in the determination step is affirmative, sending the message to the avatar.

In carrying out the invention and according to a fifth aspect thereof, there is provided a program storage medium storing a computer program in a computer readable form for executing processing on a computer system for supporting a virtual conversation in which a plurality of users can participate in a shared virtual space built and provided on a computer network, the computer program comprising the steps of: enrolling an avatar of a log-in user into the shared virtual space; imparting a virtual mobile telephone usable by any enrolled avatar to the shared virtual space at a predetermined place; determining, in response to a call from the virtual mobile telephone, whether a calling party who originated the call exists in the shared virtual space; and executing connection processing in accordance with a decision made in the determination step.

In carrying out the invention and according to a sixth aspect thereof, there is provided a program storage medium storing a computer program in a computer readable form for executing processing on a computer system for supporting a virtual conversation in which a plurality of users can participate in a shared virtual space built and provided on a computer network, the computer program comprising the steps of: enrolling an avatar of a log-in user into the shared virtual space; imparting a virtual public telephone usable by any enrolled avatar to the shared virtual space at a predetermined place; determining, in response to a call from the virtual public telephone, whether a calling party who originated the call exists in the shared virtual space; and executing connection processing in accordance with a decision made in the determination step.

In carrying out the invention and according to a seventh aspect thereof, there is provided a program storage medium storing a computer program in a computer readable form for executing processing on a computer system for supporting a virtual conversation in which a plurality of users can participate in a shared virtual space built and provided on a computer network, the computer program comprising the steps of: receiving a request for sending a message from the avatar; determining whether a destination of the message exists in the shared virtual space; and executing connection processing in accordance with a decision made in the determination step.

In carrying out the invention and according to an eighth aspect thereof, there is provided a program storage medium storing a computer program in a computer readable form for executing processing on a computer system for supporting a virtual conversation in which a plurality of users can participate in a shared virtual space built and provided on a computer network, the computer program comprising the steps of: receiving a request for sending a message from a source in real space through a public telephone network in real world; determining whether a destination of the message exists in the shared virtual space; and, if a decision made in the determination step is affirmative, sending the message to the avatar.

A user who has logged in the shared virtual world associated with the invention can send an avatar of the user into the shared virtual world. A so-called aura algorithm scheme is applied to each user computer, in which, generally, only the information inside an area of interest, namely an aura, is transferred to each user, the information outside the aura being prevented from distribution.

The aura algorithm has a drawback that communication is interrupted if the mate avatar gets out of the aura. To overcome this drawback, such an infrastructure is introduced to the shared virtual world as a mobile telephone, a PHS, or a public telephone that realizes remote communication at any given place.

According to the invention, each avatar can use its telephone such as a PHS to make communication not only in the same shared virtual world but also with another virtual world or the real world.

Therefore, a user who cannot log in a chat system at an appointed time, namely cannot enter a shared virtual world, due to some urgent business or the like may talk with another avatar, namely a user who is logging in the chat system through a PHS in the real world.

In another example, if the avatar of another user does not appear in a shared virtual space at an appointed time, namely the user of that avatar is not logging in the chat system, the mate user may send a message to that log-off user in the real world.

Further, an avatar can communicate through its PHS with an avatar living in another virtual world. In other words, avatars can use the infrastructure such as a PHS to make communication beyond a single virtual space.

The program storage media associated with the fifth through eighth aspects of the invention provide a computer program in a tangible and computer-readable form to a general-purpose computer system which can execute various program codes for example. The program storage media include a CD (Compact Disc), an FD (Floppy Disc), an MO (Magneto-Optical disc), a DVD (Digital Versatile Disc), and other detachable and portable storage media. The computer program may also be distributed through transmission media such as a network (regardless of cabled or wireless and regardless of terrestrial wave or satellite wave) including a LAN and the Internet.

The above-mentioned program media define the cooperative relationship in structure or function between computer program and providing medium for realizing the function of a predetermined program on a computer system. In other words, installing a predetermined program into a computer system by way of the program media associated with the fifth through eighth aspects calls forth the above-mentioned cooperative relationship, thereby providing the same effects as those of the first through fourth aspects of the invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawing, in which:

FIG. 3 illustrates an example of an operation caused by clicking a pet (a shared application) of the avatar of a user who has logged in a shared virtual space;

FIG. 5 shows a manner of communication by use of a mobile telephone in a virtual world;

FIG. 6 shows a manner of communication by use of a public telephone in a virtual world;

DETAILED DESCRIPTION OF PREFERRED EMBODIMENTS

This invention will be described in further detail by way of example with reference to the accompanying drawings.

1. Configuration of Community System

Figure 1:
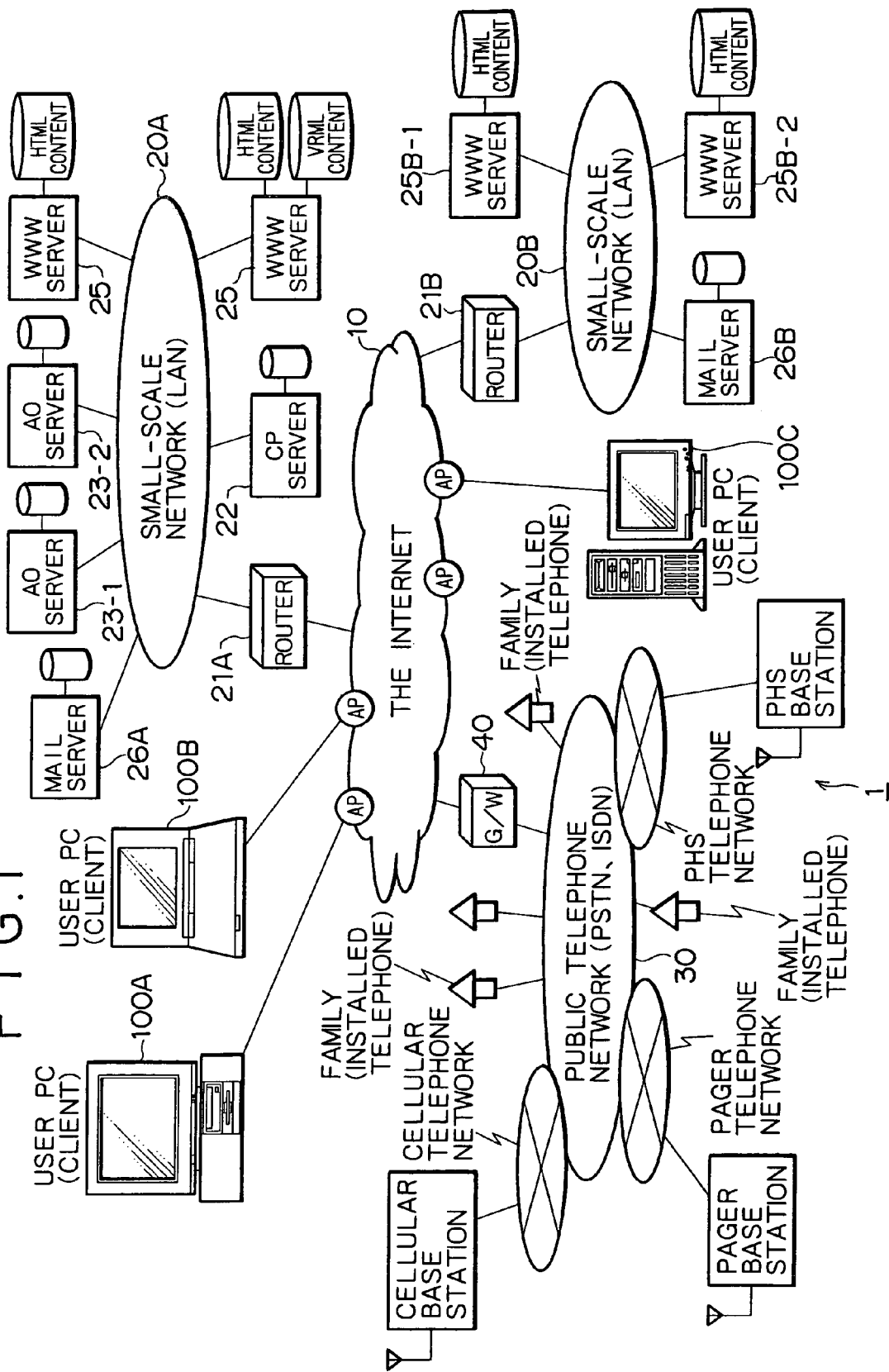
FIG. 1 is a schematic diagram illustrating a configuration of a network computing system capable of constructing and providing a shared virtual space suitable for realizing the present embodiment.

Now, referring to FIG. 1, there is shown the configuration of a network computing system 1 capable of building and providing a shared virtual world suitable for realizing the present invention. As will be described, a community system to be developed into a three-dimensional shared virtual world is built and provided on this network computing system 1. This community system comprises three components; a browser (a CP browser) for displaying and navigating a virtual space, a shared virtual world server (a CP server) for managing the virtual space, and an AO (Application Object) providing an environment for the development of shared applications.

The network computing system 1 is connected to many computer systems. These computer systems are distributed all over the world, some of them operating as servers that provide various services with charge or without charge and others operating as clients that request servers for particular services.

As shown in FIG. 1, the network computing system 1 includes, as communication media, the Internet 10, LANs (Local Area Networks) 20A, 20B, and so on as small-scale networks, and a public telephone network 30 constructed and provided by a telephone company of each country. Obviously, the entity of each of the LANs may be a single network segment or a plurality of segments interconnected by routers.

The Internet 10 is connected to the LANs 20A and 20B by routers 21A and 21B respectively. The entity of the Internet 10 is, as described before, a vast network grown globally from repeating the interconnections of the servers of the small-scale networks. The servers in the Internet 10 and the small-scale networks are accessible each other in accordance with a predetermined communications protocol such as TCP/IP (Transmission Control Protocol/Internet Protocol).

The Internet 10 and the LANs are connected to a public telephone network 30 through a gateway system 40. The public telephone network 30 includes PSTN (Public Switched Telephone Network) and ISDN (Integrated Service Digital Network) for example.

The public telephone network also accommodates many exchanges and end offices, both not shown. The end offices are connected to subscriber telephones. With the public telephone network 30, many wireless telephone networks are installed by many such carriers providing wireless communications services as a mobile telephone service provider, a PHS (Personal Handy-phone System) service provider, and a pager service provider.

The computer systems on the Internet 10 have each an IP address identifiable on the Internet. In other words, the IP address provides a logical connection between each computer and the Internet 10.

On the Internet 10, there are also Internet service providers (ISPs) for providing services for connecting to the Internet the general users who cannot execute the IP connection by leased line. The profit making Internet service providers must be officially registered as a type-2 telecommunications business. One of ISPs is So-net (trademark). So-net allows general users to dial up its server, or access point (AP), to execute the IP connection to the Internet (this is called dial-up IP connection), so that the general users are freed from an economical burden of acquiring own IP address.

A personal computer (PC) 100 of a general user IP-connected via a given Internet service provider operates mainly as a client on the Internet 10 and can request the WWW (World Wide Web) server and other various servers for various services.

Generally, in addition to the dial-up IP connection service, Internet service providers provides various applications such as chat, BBS (Bulletin Board System), and electronic mail on the Internet 10.

Obviously, various parent organizations other than Internet service providers can provide Internet applications such as chat, BBS, and electronic mail.

In the example shown in FIG. 1, an Internet service provider operating the LAN 20A provides a community system associated with the present invention. In this community system, users can make virtual reality communication such as chat by means of avatars in a three-dimensional shared virtual world.

Chat is a service for providing realtime communication between remote users through the Internet 10. Especially, three-dimensional chat provides a real-time communication environment in which each log-in user sends his or her avatar into a three-dimensional shared virtual world drawn by three-dimensional graphics for realtime communication with other log-in users. A three-dimensional shared virtual world, or the community system, on a WWW system can be described by VRML (Virtual Reality Modeling Language) 97 of ISO (International Organization for Standardization) for example. The activities in the community system can be described by use of Java. Three-dimensional shared virtual worlds thus described can be displayed and navigated by use of VRML browsers. For details of VRML 97, refer to "http://www.vrml.org/Specifications/VRML97/".

The LAN 20A is arranged with a shared virtual world (the Community Place (CP)) server 22 for building and providing a shared virtual world on the Internet 10, providing an environment in which various social activities are performed in the shared virtual world, and managing the shared virtual world and one or more application object (AOs) servers 23-1, 23-2, and so on.

The LAN 20 A may also be arranged with one or more WWW servers 25 and so on for providing HTTP (Hyper Text Transfer Protocol) resource objects such as HTML (Hyper Text Markup Language) content and a mail server 26 for providing an electronic mail transfer service. The servers 22, 23-1, 23-2, 25, and 26 arranged on the LAN 20A can be accessed from the Internet 10 through the router 21A.

In the present embodiment, the WWW server 25 provides a VRML file describing the three-dimensional virtual world in addition to the ordinary HTML content. This VRML file also contains the descriptions of the virtual world and shared applications, the address (uniform resource locator URL) of the shared virtual world (CP) server 22 or its link reference.

The computer (PC) 100 of the user who logs in the three-dimensional shared virtual world associated with the present embodiment has both of an HTML browser for browsing the HTML content provided by the WWW server 25 and a VRML browser for handling VRML files. The VRML browser used in the present embodiment is also called a CP browser because it displays and navigates a shared virtual world (the Community Place (CP)). The HTML browser and the CP browser can be operated on a same platform provided by Windows 95, Windows 98, or NT of Microsoft Corp. for example. The user computer 100 itself is constituted by an PC/AT (Personal Computer/Advanced Technology) or its succeeding versions or their compatibles.

A three-dimensional shared virtual world constructed by use of VRML allows each object arranged therein to realize an autonomous action, namely a behavior, in response to an event taking place in response to a user operation and a timer event taking the passing of preset time.

A behavior is realized by the cooperative actions of three elements; sensor, routing and script.

(1) A sensor node related beforehand with a node of an object for example disposed in a three-dimensional world and described as a VRML file senses an external event on the basis of a change of its field generates an event inside a VRML scene.

(2) The generated event is routed or transmitted to an external script, which is a program for specifying the behavior of the object, on the basis of a routing described as a VRML file.

(3) In the external script, a method to be called at arrival of the event is described beforehand. The external script which received the event transmitted by routing executes the processing based on the description and then changes the field value of a corresponding node inside the VRML scene on the basis of a result of the processing and the description of the routing.

VRML defines, as sensor nodes, TouchSensor for generating event when a mouse cursor passes over a specified object or when it is clicked, ProximitySensor for generating an event when user viewpoint enters a specified area, and TimerSensor for generating an event every time a predetermined time is reached or a predetermined time interval passes, for example.

2. Behavior Architecture of Community System

Figure 2:
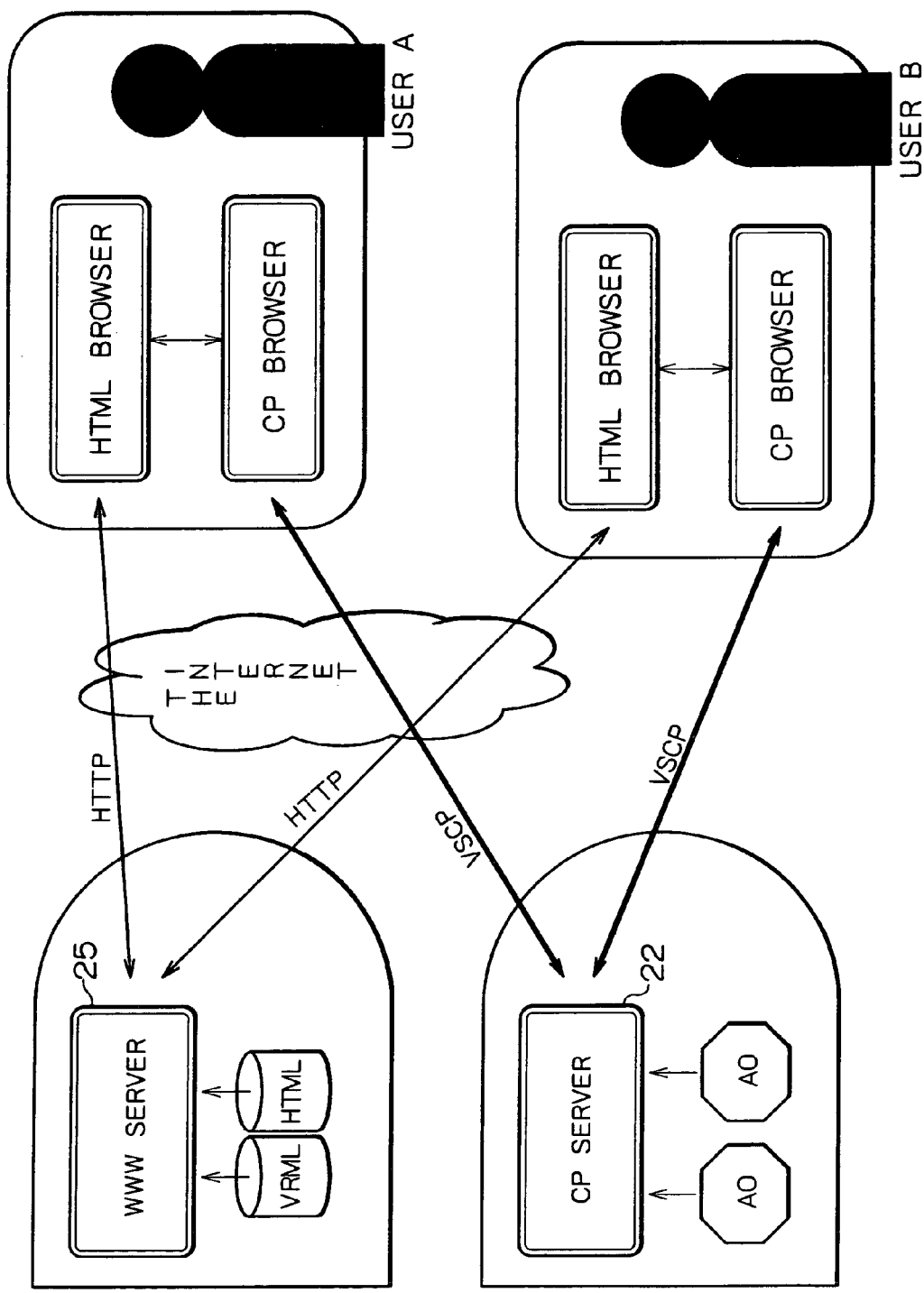
FIG. 2 is a schematic diagram illustrating a behavior architecture for displaying and navigating the shared virtual world associated with the present invention on a computer of a user who has logged in this shared virtual world.

FIG. 2 shows a behavior architecture for displaying and navigating a shared virtual world associated with the present embodiment on the computer 100 of the user who logs in this shared virtual world. As described, on the computer 100 of each of users A and B, an HTML browser and a CP browser capable of interpreting VRML content are operating. The HTML browser is Netscape Navigator of Netscape Communications or Internet Explorer of Microsoft Corp. for example.

The user computer 100 is connected to the Internet 10 by going through a predetermined procedure such as executing dial-up IP connection to a nearby access point (AP). In addition, the user computer 100 access the WWW server 25 through the HTML browser according to HTTP protocol. Then, retrieving a VRML file for describing the shared virtual world from the WWW server 25, the user computer 100 passes the VRML file to the CP browser.

The CP browser analyzes the VRML file and displays it on a browser screen. If the address of the CP server 22 is specified in the VRML file, the CP browser attempts connection to the CP server 22. CP browsers that have retrieved the same VRML file connect (namely, log in) to the same CP server 22, so that these CP browsers can share the VRML scene described by the retrieved file, namely the same three-dimensional virtual world.

When the connection to the CP server 22, namely the log-in to the shared virtual world has been successful, the communication thereafter is carried out is by use of a predetermined server-client protocol (referred to herein as VSCP (Virtual Society Server Client Protocol) for the communication between the CP server 22 and the CP browser. This VSCP includes a capability of notifying the CP server 22 of changes made by the user by use of the CP browser and a capability of notifying another CP browser of the notified information by the CP server 22.

The CP server 22 can restrict the distribution of information required by each user (namely, the information to be sent to each CP browser) by use of an aura algorithm. An aura denotes an area around an avatar, namely an area in which the user is interested as described before. The information about things outside an aura is regarded as out of interest and therefore not sent to the CP browser. Application of the aura algorithm can limit the quantity of the information to be distributed, thereby preventing the network traffic to each log-in user from exceeding a specified channel capacity.

The shared virtual world provided by the CP server 22 contains various objects such as the avatars of users and pets (virtual creatures bred by avatars). These objects, the behaviors of objects, and other virtual world applications are shared by users and therefore, these are herein referred to as shared applications.

The AO (Application Object) on the AO server 23 manages the shared applications. The development environments of the AO are mainly Java and C++ programming languages. The AO provides API (Application Programming Interface) for controlling the access to the internal information of the CP server 22, an event handler such as a timer, and the shared objects managed by the AO. The shared objects herein include avatars appearing on the browser of each user computer (namely, shared by users) and the virtual creatures (pets) bred by avatars.

The AO server 23 can communicate with the CP server 22 by use of a predetermined application protocol. Therefore, the CP server 22 and the AO server 23 need not operate on a single server machine; as shown in FIG. 1, they can be scalable architectures existing as independent computer systems.

Figure 3:
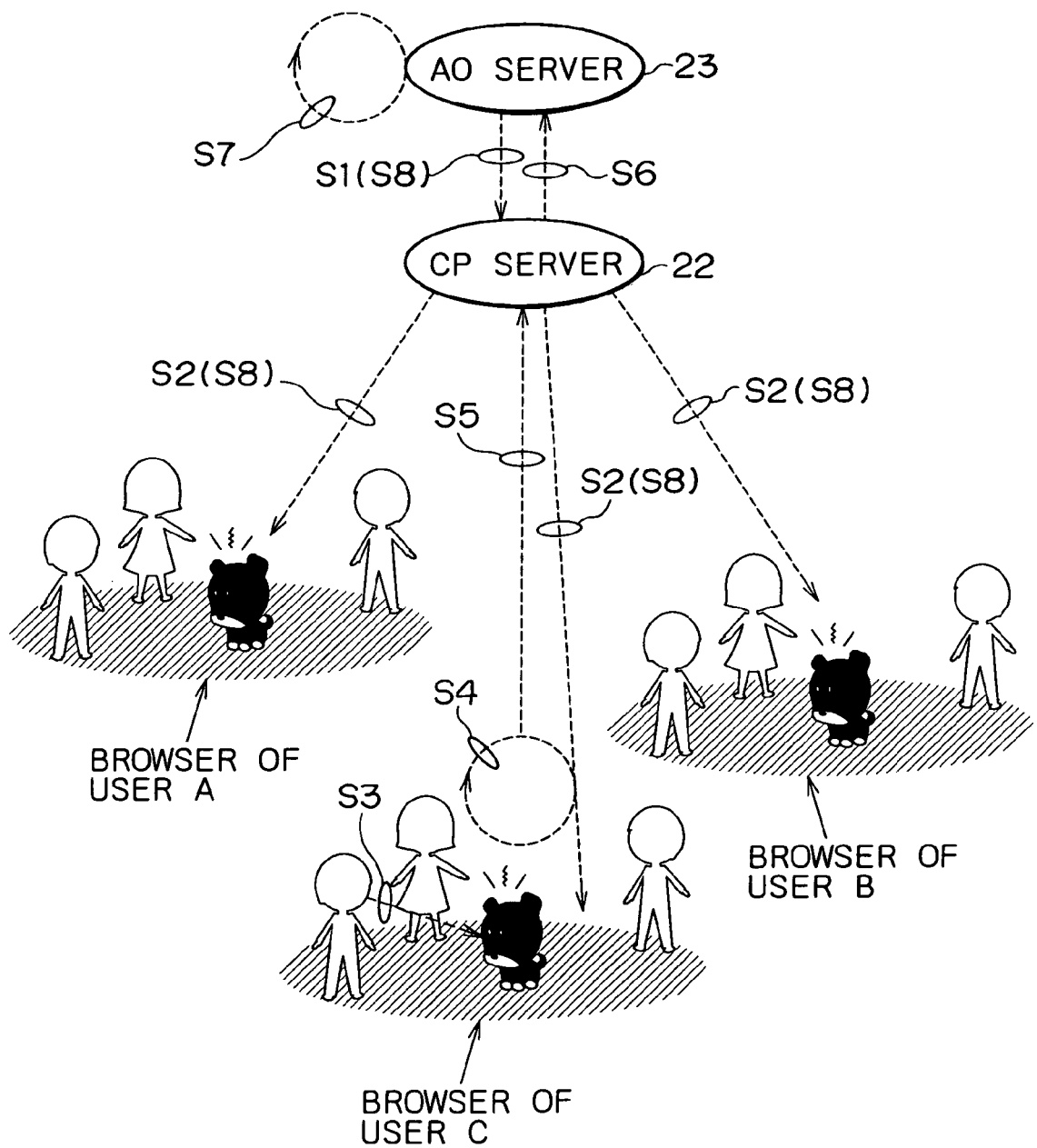
FIG. 3 is a schematic diagram illustrating an operation mechanism of an AO associated with the invention; to be more specific.

FIG. 3 shows the behavior mechanism of the AO associated with the present embodiment by way of example. In the example shown, a behavior in which a pet (a shared application) of an avatar produces a sound when the log-in user of the avatar clicks the pet is shared by log-in users.

When the AO server 23 connects to the CP server 22, the AO server 23 issues a request to the CP server 22 for adding the shared objects managed by the AO server 23 to the shared virtual space (S1).

The CP server 22 transfers this request to all CP browsers connected to the CP server 22. Consequently, the shared objects appear on each CP browser, namely the monitor of each currently log-in user (S2).

If a user selects (or clicks) a shared object on the CP browser (S3), the corresponding script is activated on the CP browser (S4). This script sends a message to the CP server 22 (S5).

The CP server sends this message to the AO server 23 managing the selected shared object (S6). The AO server 23 executes message processing and returns the processed message to all other CP browsers via the CP server 22 (S7). As a result, the message is passed to the corresponding shared object of each of the other CP browsers, executing the same processing on the corresponding shared object (S8).

3. Telephone Capabilities in Community System

As described, in the community system associated with the present invention, the quantity of information to be distributed is limited by use of the aura algorithm, thereby preventing the network traffic to each log-in user from exceeding a specified channel capacity.

Figure 4:
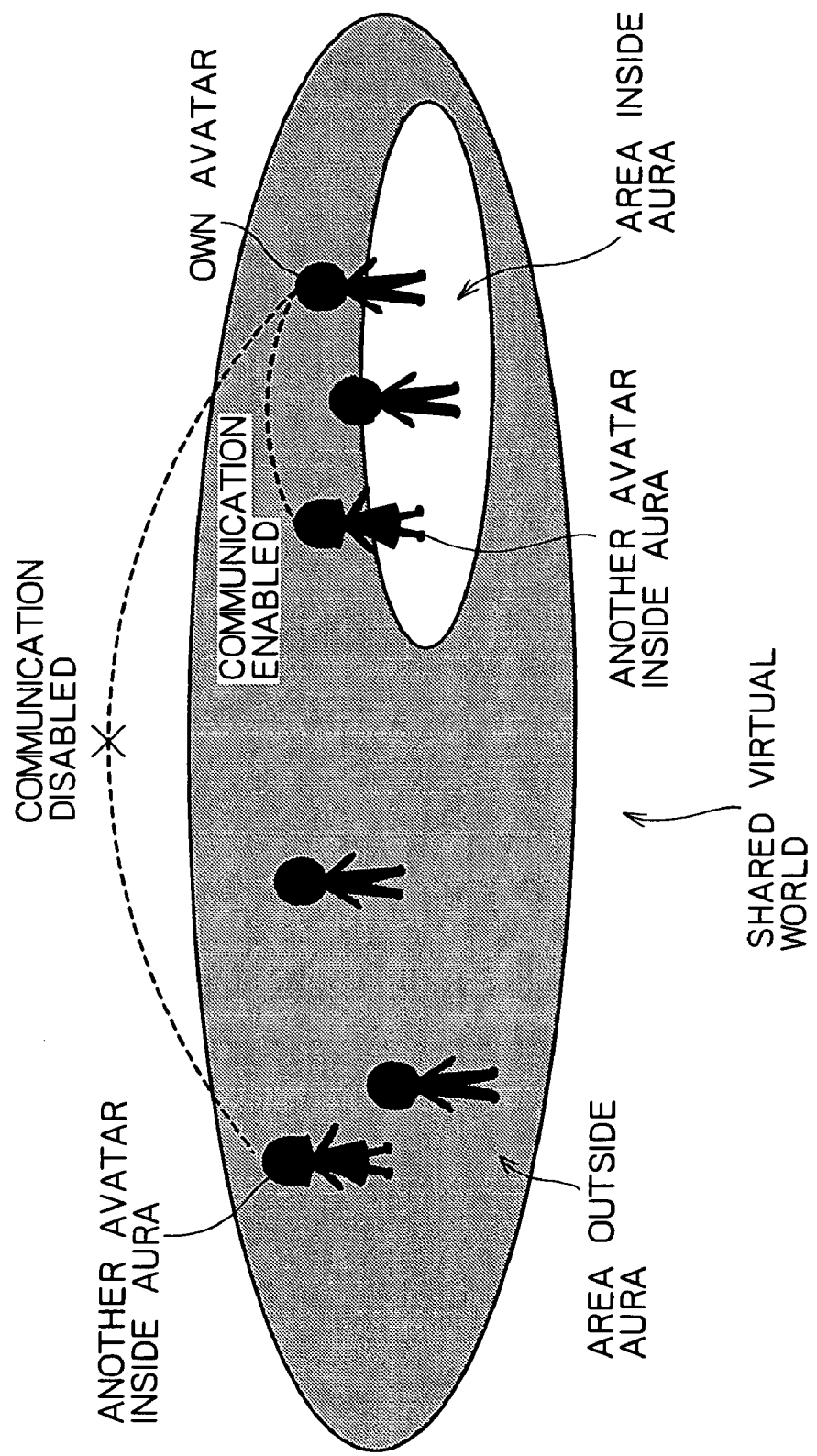
FIG. 4 is a schematic diagram illustrating a condition in which communication with an avatar outside an aura cannot be executed in a shared virtual space.

However, as described before, the aura algorithm has a drawback that an object outside an aura becomes incommunicado (refer to FIG. 4). This does not pose a serious problem by setting the aura to a size large enough for each user to view at a glance on the monitor screen in the case of a normal interaction with avatars.

If a virtual world itself has a vast expanse, however, and an event in which plural users participate at a time is to be held, there occurs a demand for making activities by communicating with remote avatars.

Figure 5:
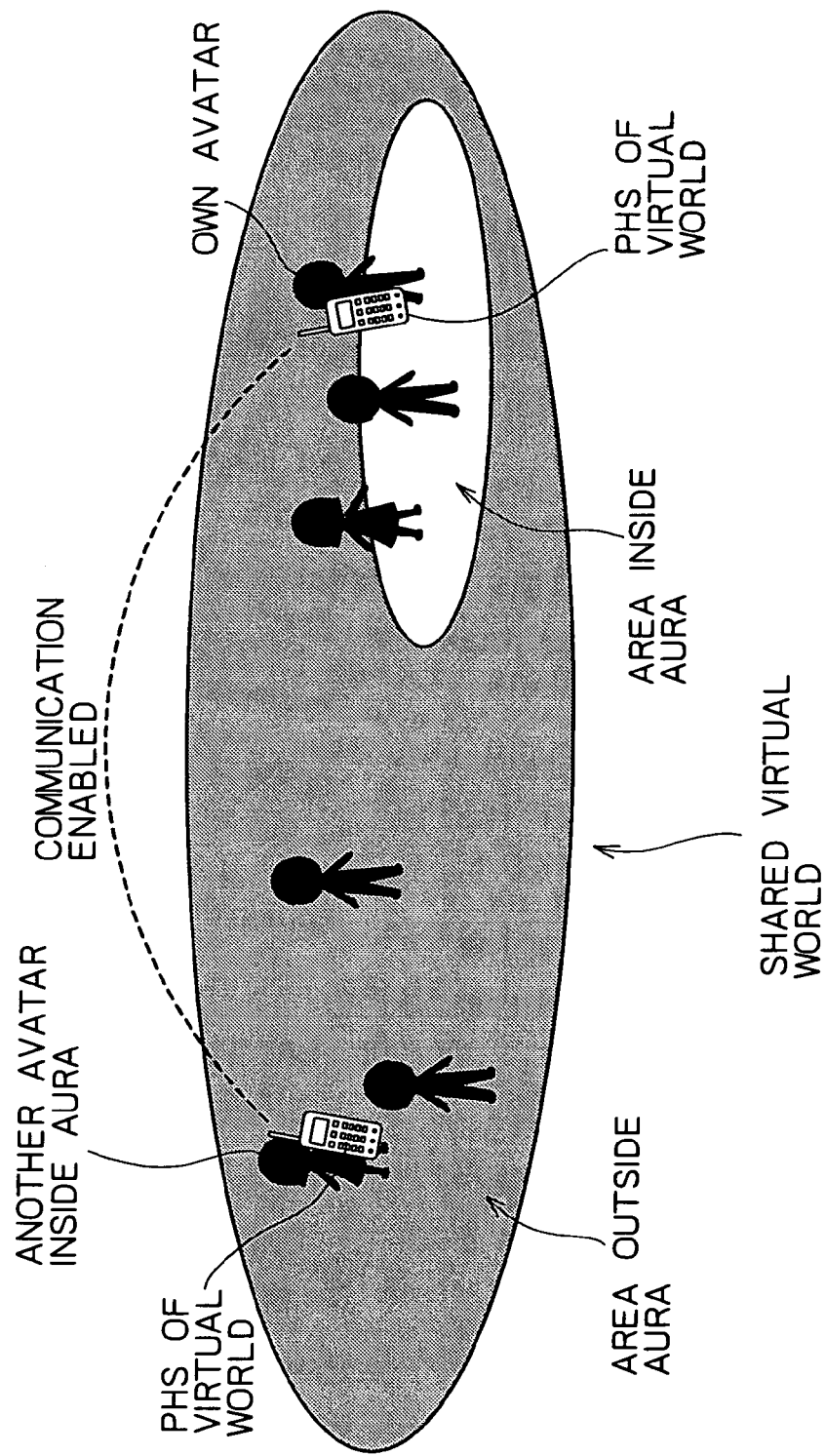
FIG. 5 is a schematic diagram illustrating a manner in which communications with an avatar outside an aura is executed by use of a telephone in a shared virtual world; to be more specific.
Figure 6:
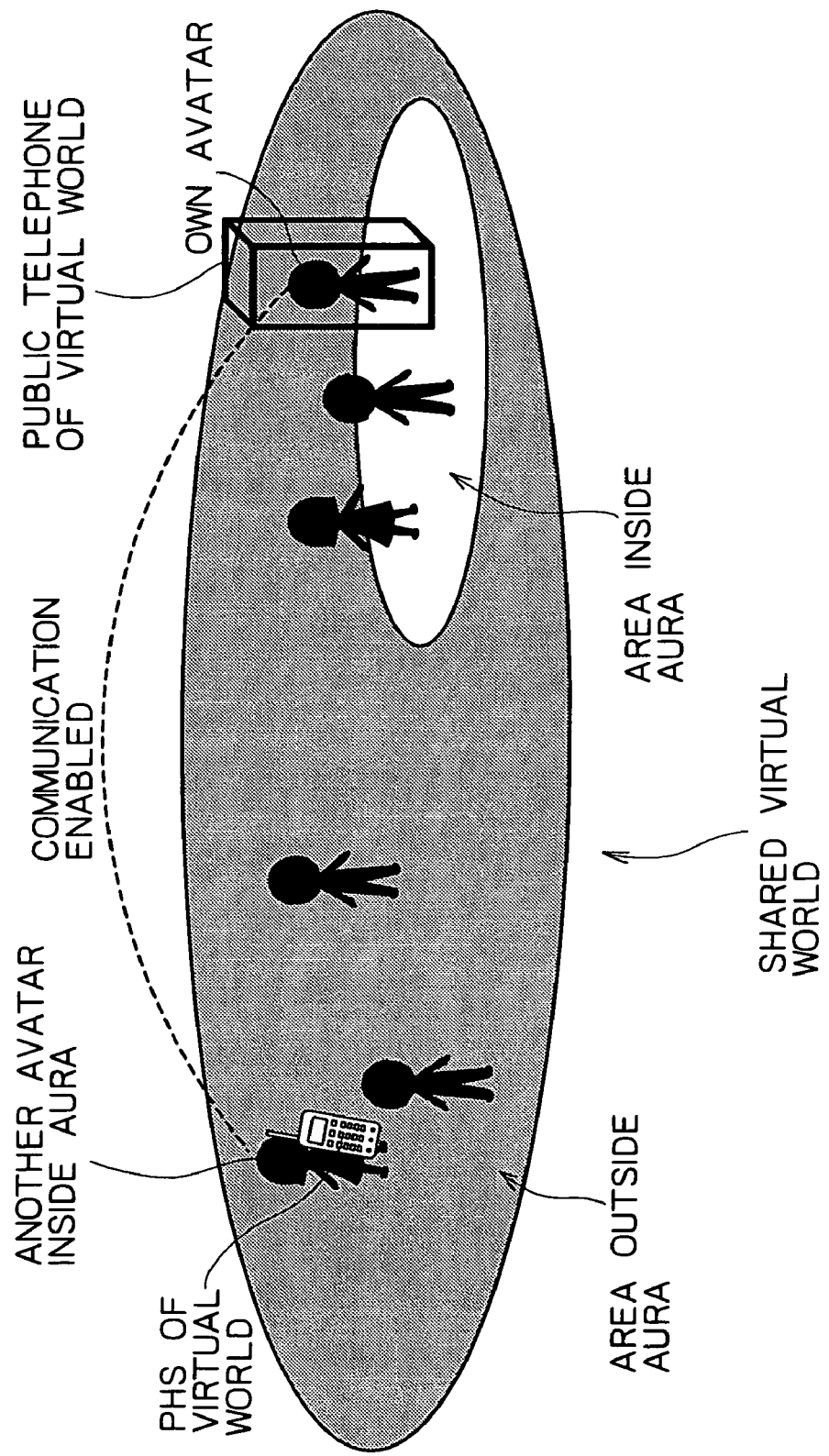
FIG. 6 is a schematic diagram illustrating a manner in which communication with an avatar outside an aura is executed by use of a telephone in a shared virtual world; to be more specific.

In the community system associated with the present embodiment, such infrastructures for implementing the communications with remote avatars as mobile telephone, PHS, and public telephone are introduced in each shared virtual space (these telephone systems are hereafter referred to also as virtual telephones). Consequently, avatars can make communication with each other by use of mobile telephones (refer to FIGS. 5 and 6). The telephone is a device for supporting realtime communication between remote users also in the real world. In conversation through virtual telephones, a calling avatar need not bring a called avatar into the aura of the calling avatar or vice versa. The virtual telephone also allows avatars not always certain in whereabouts in a shared virtual space to communicate each other.

In addition to the basic capability of one-to-one real-time communication between avatars in the same shared virtual space, the telephone introduced in a shared virtual space may have various features of the mobile telephone used in the real world. For example, these features include a telephone directory capability by which the names and telephone numbers are registered beforehand and only a registered name need to be selected for dialing, an incoming call rejection directory capability by which specific users are registered beforehand to reject the receipt of their calls, and a nuisance call rejection capability by which the calls from the specified users registered in the incoming call rejection directory are rejected.

The present embodiment also adds to the virtual telephone of each avatar a capability of making communication with another virtual world or with the real world.

Figure 7:
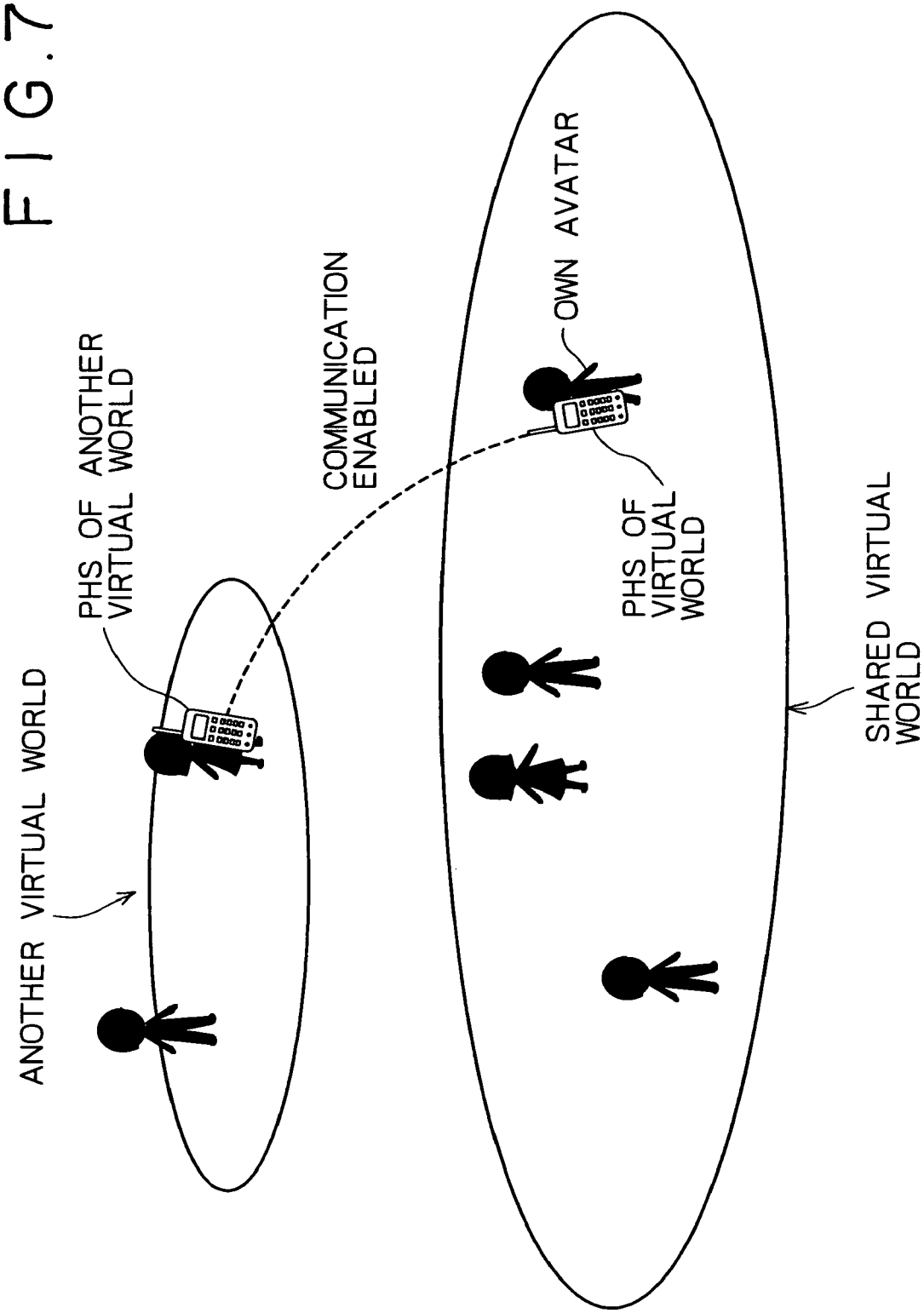
FIG. 7 is a schematic diagram illustrating a manner in which an avatar inside a shared virtual space associated with the present invention communicates with a user in another virtual world by use of a virtual telephone.

Another virtual world herein denotes a different virtual space built and provided on the WWW of the Internet 10 by a server other than the CP server 22 or a virtual space built and provided on the WWW by a service provider of a different parent organization. This another virtual world may be provided by a server on a small-scale network other than the LAN 20. Communication with another virtual world demotes calling by telephone an avatar living in this another virtual world from the shared virtual world associated with the present embodiment (refer to FIG. 7).

Figure 8:
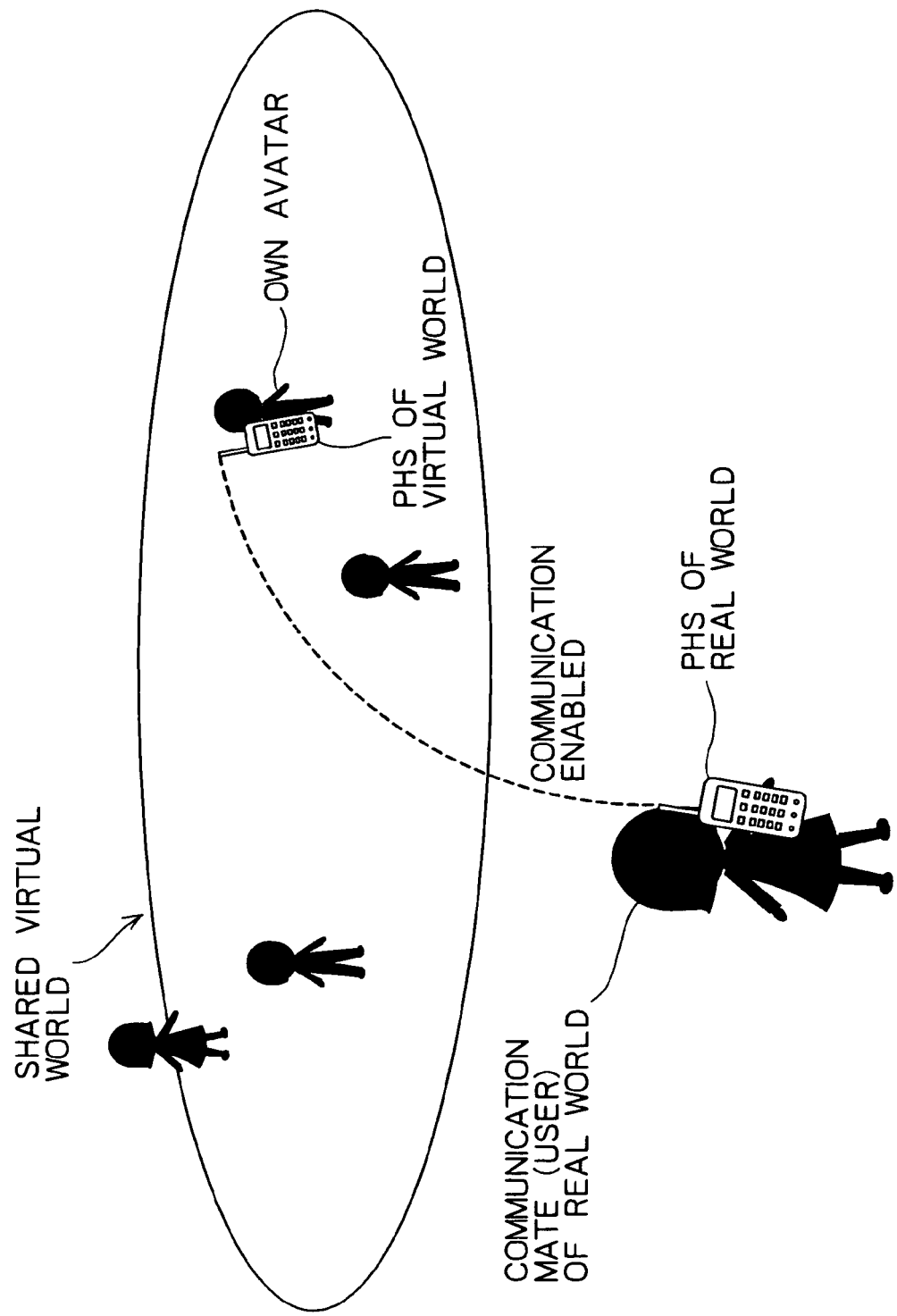
FIG. 8 is a schematic diagram illustrating a manner in which an avatar inside a shared virtual space associated with the present invention communicates with a user in the real world by use of a virtual telephone.

The real world herein denotes the real world or space other than any digital space built in computing environment. The communication in the real world is carried out via the public telephone network 30 including PSTN, ISDN, cellular, and PHS systems. Namely, the communication with the real world from a virtual mobile telephone denotes calling user in the real world from the shared virtual world associated with the present embodiment (refer to FIG. 8). Alternatively, this communication may be carried out by use of electronic mail.

Figure 9:
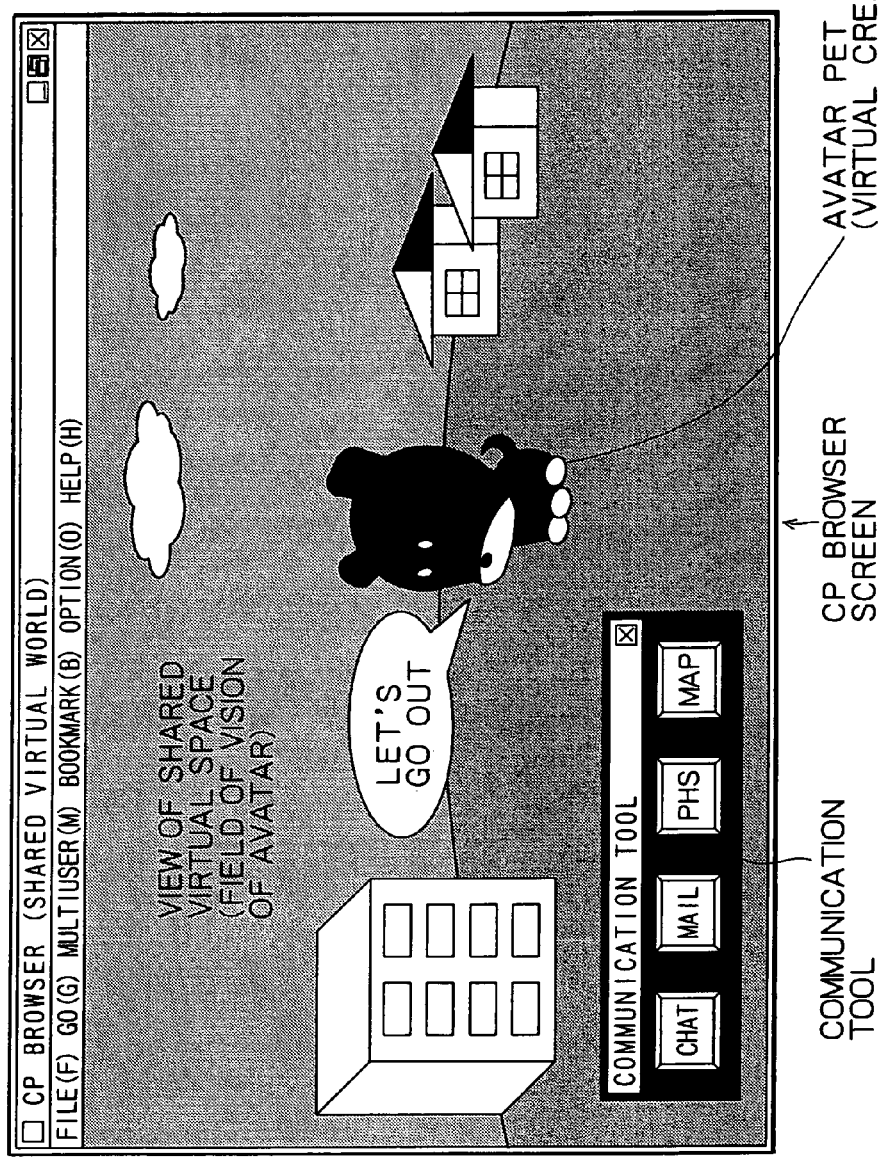
FIG. 9 is a diagram illustrating a GUI (Graphical User Interface) screen (a CP browser window) provided on a computer 100 of a user who has logged in a community system associated with the present invention.

FIG. 9 shows a GUI (Graphical User Interface) screen provided on the computer 100 of a user who is logging in the community system associated with the present embodiment.

This GUI screen is displayed by the CP browser which interprets VRML. As shown, the CP browser frame displays a scene around an avatar (or a scene in the visual range of that avatar) in a shared virtual world. As shown, a pet (a virtual creature) bred by the avatar may be displayed. Remarks made by the avatar or its pet are shown in a speech balloon. The user can make the avatar have a stroll in the shared virtual space by operating the mouse cursor within the browser frame. The GUI screen may also have features such as zoom-in/zoom-out, rotation, and jump of the displayed scene.

In addition, the GUI screen associated with the present embodiment has "Communications Tool" window. "Communications Tool" window has functional buttons for calling such various capabilities necessary for establishing the communication with other avatars (or their users) and other activities in the virtual world as chat, letter, PHS, and map of shared virtual world.

Figure 10:
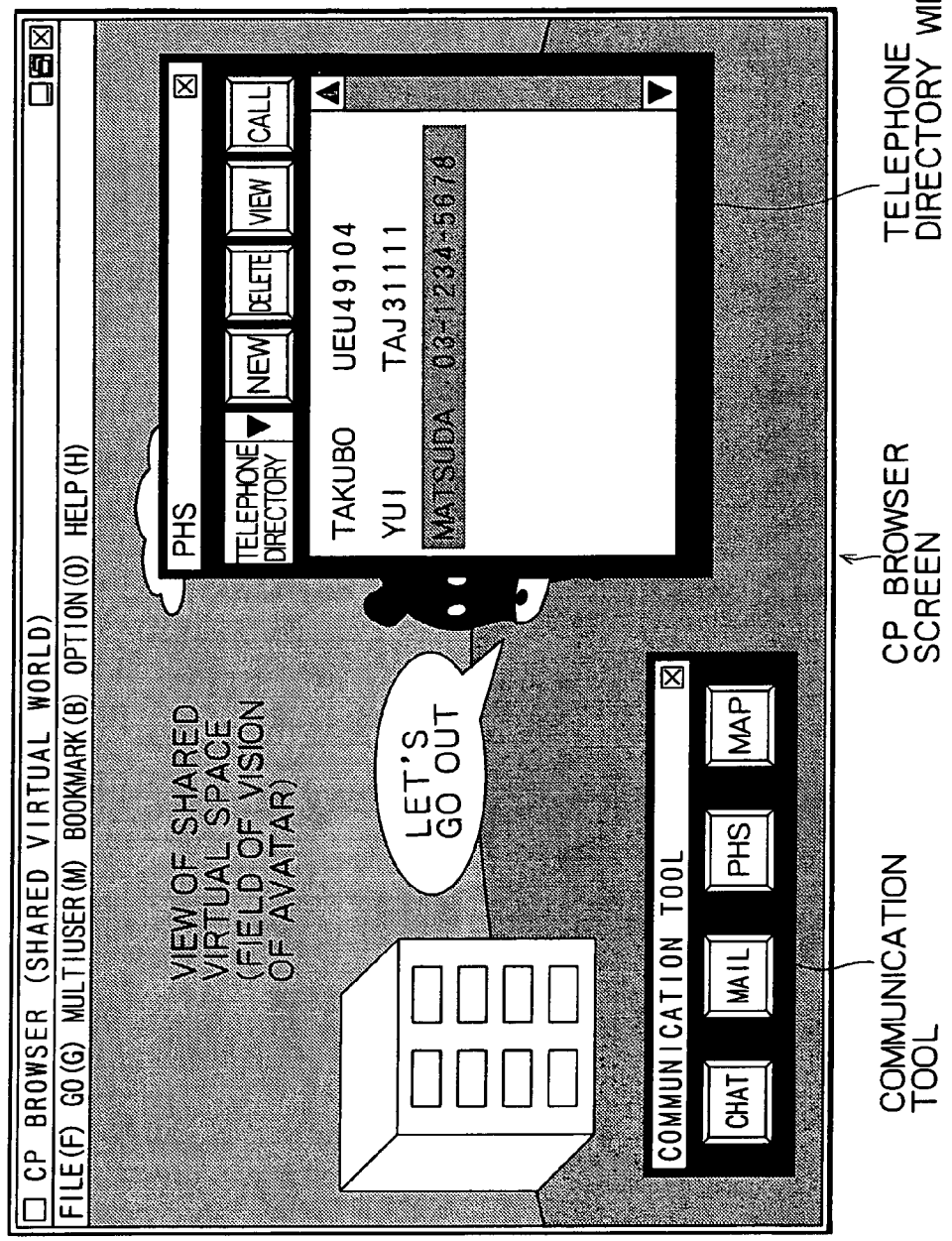
FIG. 10 is a diagram illustrating a picture in which "Telephone Directory" window appeared on the CP browser screen.

When "PHS" button is pressed, "Telephone Directory" window appears as shown in FIG. 10. "Telephone Directory" window shows a list box listing entries of the names registers avatars or registered users (or the handles of registered users) and their contact addresses. Contact addresses herein denote the numbers of mobile telephones or PHS telephones of the avatars in the shared virtual world associated with the present embodiment and other virtual worlds and the numbers of mobile telephones or PHS telephones or electronic mail addresses of the users in the real world.

Clicking "New" button in "Telephone Directory" window can enter a new contact address into the telephone directory. Clicking "Delete" button can delete a selected entry (highlighted) from the telephone directory. Clicking "View" button can display the property of an avatar (or user) corresponding to the selected entry.

Clicking "Call" button causes "PHS Talk" window to pop up. In "PHS Talk" window, the user calls a destination of communication, an avatar selected by the telephone directory for example and enters a reply message.

Figure 11:
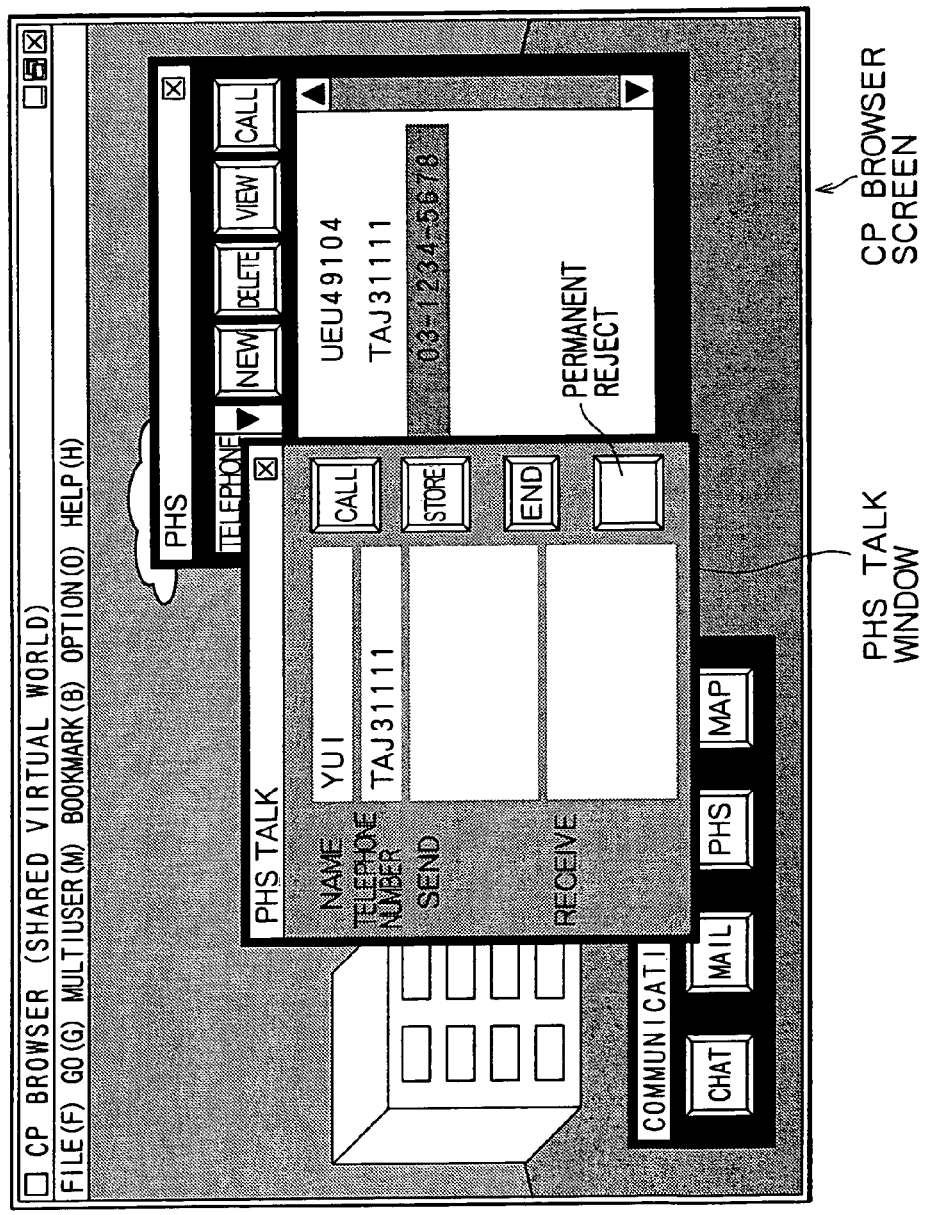
FIG. 11 is diagram illustrating a communications tool displayed on the CP browser screen when a shared virtual space is searched for a public telephone box and it is accommodated in an aura.

FIG. 11 illustrates "PHS Talk" window. As shown, "PHS Talk" window includes "Name" field and "Telephone Number" field in which the name of telephone number of a called party are entered, "Send" field in which a message text to be sent is entered, and "Receive" field in which a received message is displayed. When "PHS Talk" window is called from the telephone directory, the user name (or avatar name) and telephone number of the entry selected by the list box of the telephone directory are automatically entered in the corresponding fields.

In addition, "PHS Talk" window has "Call" button for starting a calling operation, "Store" button for storing the entry made in the window, and "Permanent Reject" button for semipermanently rejecting the termination of calls from the users or avatars corresponding to the entered names and telephone numbers. When "Call" button is clicked, operations for calling the destination and transferring messages start.

Figure 12:
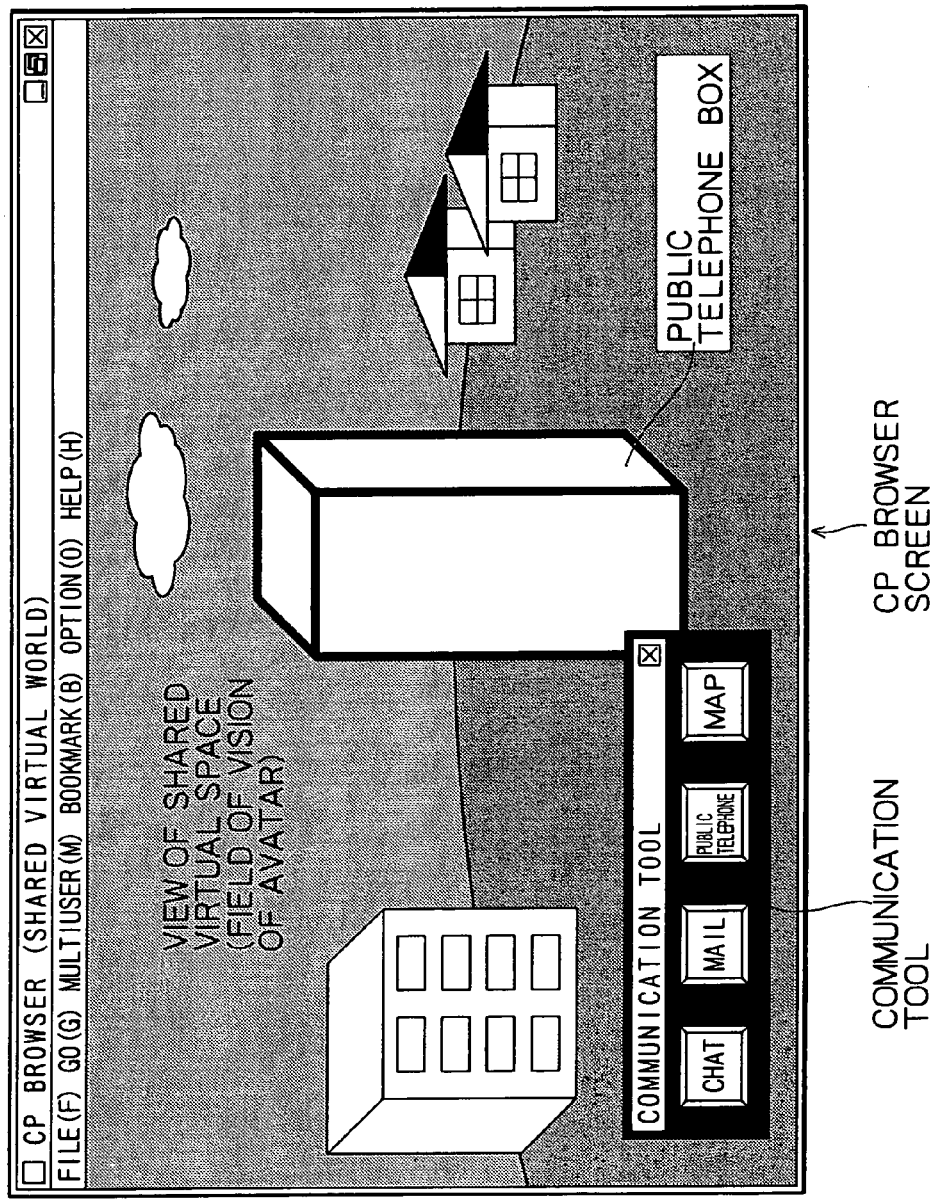
FIG. 12 is a diagram illustrating a picture in which "PHS Talk" window popped up in response to the clicking of "Call" button in "Telephone Directory" window.

Instead of PHS and mobile telephones, a public telephone box (described before) may be installed in the shared virtual world. For example, when an avatar searches the shared virtual world and accommodates a retrieved public telephone box in its aura, the communication tool having "Public Telephone" button appears (refer to FIG. 12). An operational procedure to be followed after clicking "Public Telephone" button is as described with reference to FIG. 10.

The following describes the processing for making a telephone call (or sending a message) from the shared virtual world to the same virtual world, another virtual world, and the real world.

Figure 13:
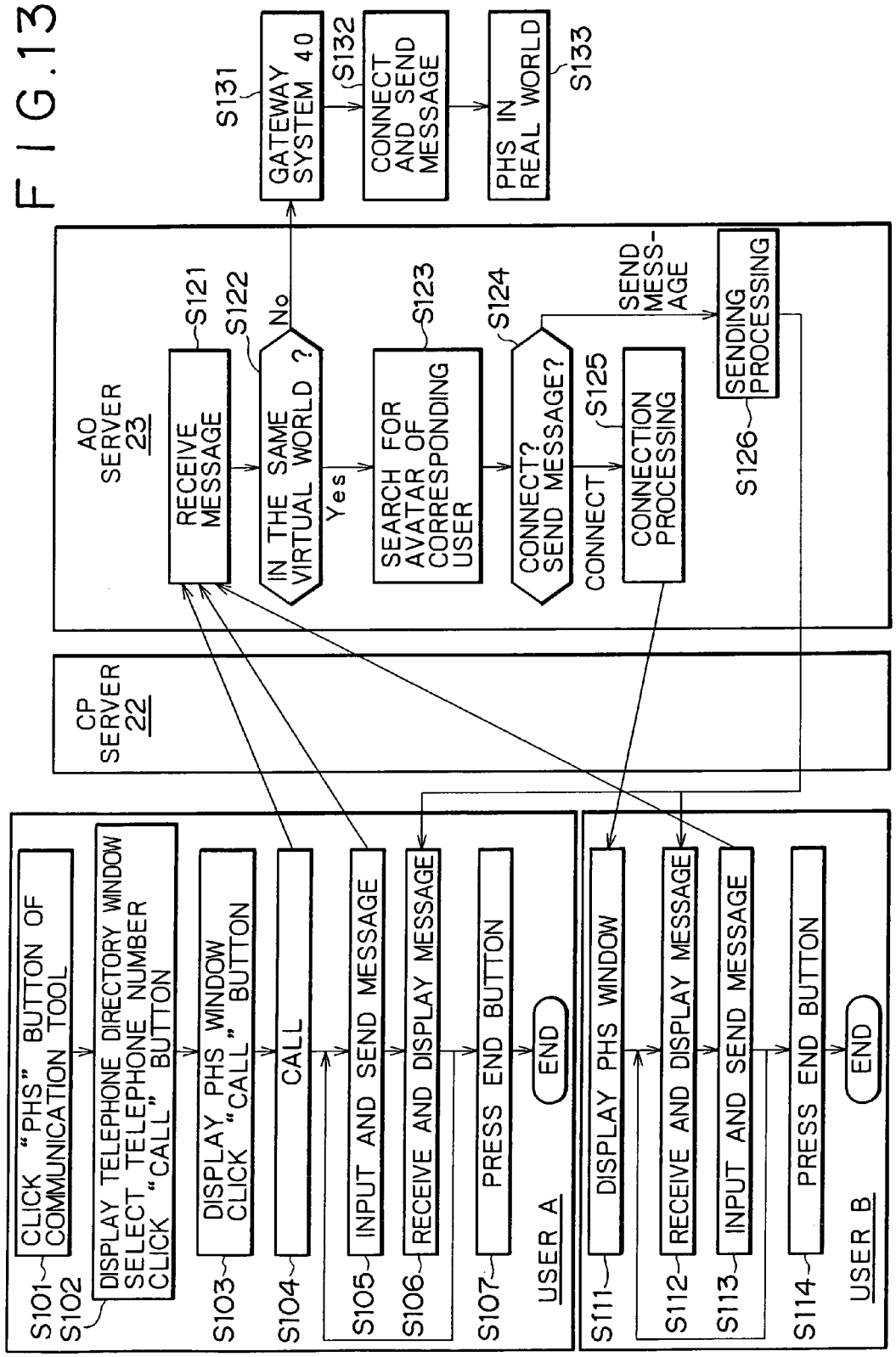
FIG. 13 is a flowchart indicative of a procedure of processing to be executed when a user in a shared virtual world makes a call through the avatar of the user.

FIG. 13 is a flowchart indicative of the processing for making a telephone call by user A in the shared virtual world through the avatar of this user. The following describes each step of this processing.

First, user A clicks "PHS" button arranged in "Communications Tool" (step S101) to call the PHS or telephone capability of the virtual world. "Telephone Directory" window appears on the CP browser screen. Instead of using the PHS at a given place in the shared virtual world, user A may accommodate a public telephone box into the aura of user A and click "Public Telephone" box.

Next, user A selects a desired telephone number entry from the list box in "Telephone Directory" window and clicks "Call" button (step S102).

The telephone number selected here is the number of the PHS or mobile telephone of a called avatar in the present shared virtual world, the number of the PHS or mobile telephone of a called avatar in another virtual world, or the number of the PHS or mobile telephone of the electronic mail address of a called user in the real world. It should be noted that, before entering the telephone numbers of destination avatars into the telephone directory, the telephone numbers must be exchanged between avatars, the description of which will be skipped because this process is not directly related to the gist of the present invention.

Upon clicking "Call" button in "Telephone Directory" window, "PHS Talk" window appears. In "PHS Talk" window, the user can enter the name and telephone number of a called party, check the entries, and input a message text to be sent, for example. Next, the user clicks "Call" button in "PHS Talk" window (step S103), upon which a calling operation starts (step S104).

The calling by user A is communicated to the AO server 23 via the CP server 22 (step S121).

The AO server 23 determines whether the called party is inside the same shared virtual world or not (step S122).

If the called party is found inside the same shared virtual world, the AO server 23 searches for the avatar of the called party (let this avatar be user B) (step S123). Actually, the AO server 23 searches the AO, which is an avatar managing entity.

To connect the call to the avatar of the called party (step S124), predetermined connection processing is executed between AOs.

When the connection has been established, "PHS Talk" window appears on the PC browser of user B, the called party (refer to the above description and FIG. 11). In this "PHS Talk" window, user B can check the name and telephone number of the calling party (in this case, user A). In addition, user B can display a received message and input a message to be sent.

While the connection is kept between the avatars of user A and user B, messages can be transferred anytime. For example, when sending a message from user A, user A inputs a message text to be sent in "Send" field in "PHS Talk" window and sends this message (step S105). The message is passed to the AO server 23 through the CP server 22, upon which the processing for sending this message to user B is executed (step S126). In the "PHS Talk" window of user B, the received message is displayed in "Receive" field (step S112).

When sending a message from user B, user B inputs a message text to be sent in "Send" field of "PHS Talk" window and sends the message (step S113). This message is passed to the AO server 23 through the CP server 22, upon which the processing for sending the message to the avatar of user A is executed (step S126). In "PHS Talk" window of user A, the received message is displayed in "Receive" field (step S106).

User A and user B can disconnect the talk by clicking "End" button in "PHS Talk" window (refer to FIG. 11) of each (step S107 and step S114).

On the other hand, if the called party specified by user A is not found in the same shared virtual world, the processing by the AO server 23 goes to "No" decision of step S122. If the specified called party is found in the real world for example, connection with the PHS in the real world is established (step S132) by way of the gateway system 40 (step S131), upon which the message is sent (step S133).

If the called party specified by user A is found in another virtual world, the AO server 23 connects to this another virtual world through the gateway to search the AO, which is an entity for managing the avatars in this another virtual world, thereby sending the message to the avatar of the called party.

Figure 14:
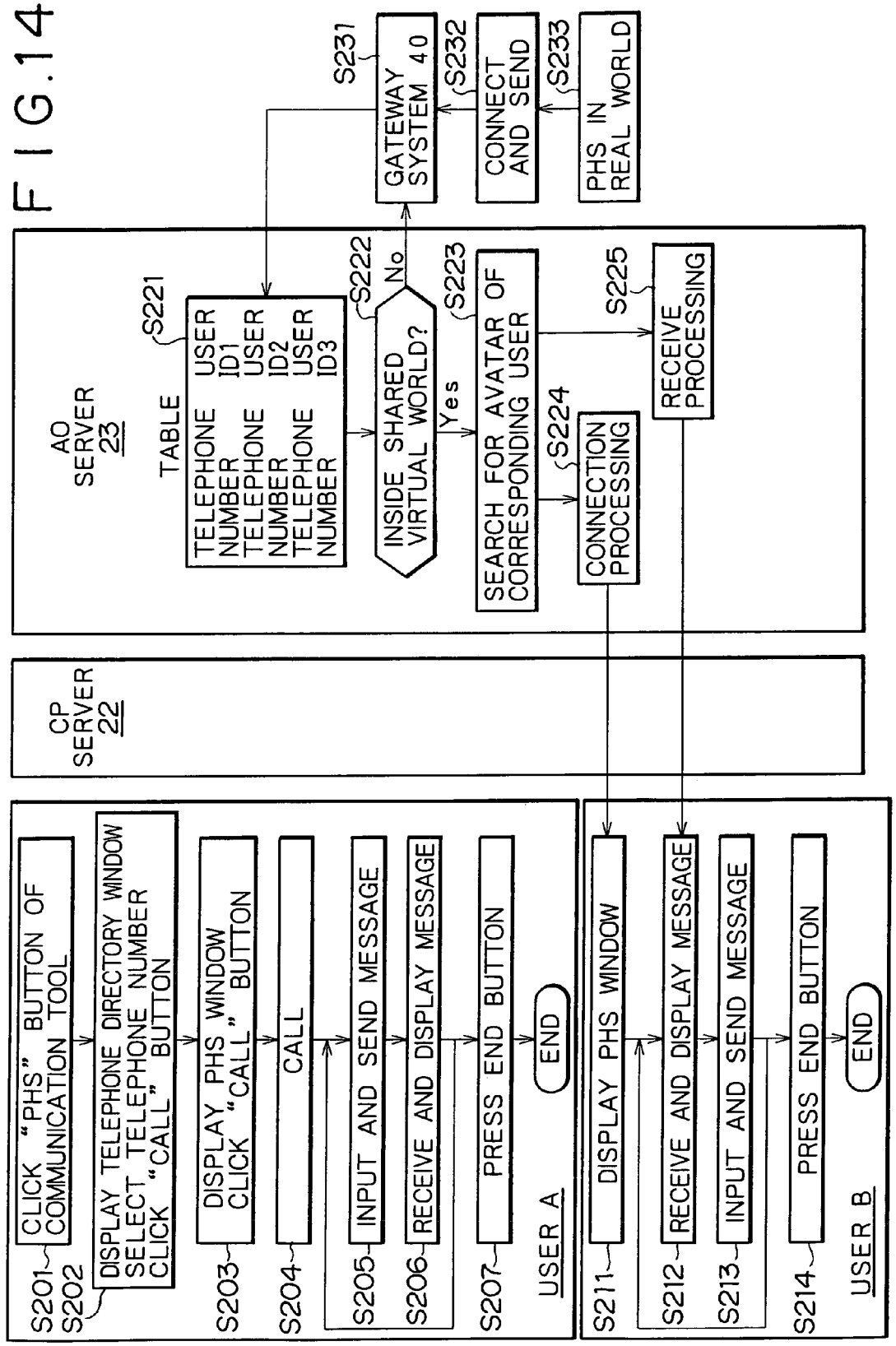
FIG. 14 is a flowchart indicative of a procedure of processing to be executed when a user makes a call from the real world to an avatar living in a shared virtual world.

FIG. 14 is a flowchart indicative of the processing procedure for calling from a PHS in the real world to the avatar of user B in the shared virtual world. The following describes each step of this processing.

When a user makes a telephone call by use of a PHS in the real world and sends a message (step S233), the message is passed to the AO server 23 through the gateway system 40 (step S232 and step S231).

The AO server has a table for managing the telephone numbers of the users or avatars under the control of the AO server 23. Upon reception of the call from the real world through the gateway system 40, the AO server 23 searches this table for user identification information (step S221).

If the AO server 23 is unsuccessful in retrieving the user identification information, it indicates that the corresponding user does not exist in the shared virtual world. Then, the processing by the AO server 23 goes to decision "No" of step S222, thereby notifying the PHS of the real world through the gateway system 40 of the fact that the desired user or avatar does not exist in the shared virtual world.

If the AO server 23 is successful in retrieving the user identification information, it indicates that the corresponding user is inside the shared virtual world. Therefore, the processing by the AO server 23 goes to decision "Yes" of step S222 to search for the avatar of the called party (user B) (step S223). Actually, the AO server 23 searches the AO, which is an avatar managing entity.

To connect the call to the avatar of the called party, predetermined connection processing is executed between AOs.

When the connection has been established, "PHS Talk" window (refer to the above description and FIG. 11) appears in the PC browser of user B, the called party. In this "PHS Talk" window, user B can check the name and telephone number of the calling party (in this case, the PHS in the real world) (provided that the number display capability is active). In addition, in "PHS Talk" window, user B can display the received message and input a message to be sent.

While the connection is kept between the avatars of user A and user B, messages can be transferred anytime. For example, when sending a message from a PHS in the real world, the AO server 23 executes message receive processing (step S225). In "PHS Talk" window of user B, the received message is displayed in "Receive" field (step S212).

When a message is sent from user B, user B inputs a message text to be sent in "Send" field of "PHS Talk" window and sends this message (step S213). This message is then passed to the AO server 23 through the CP server 22, upon which the processing for sending the message to the PHS in the real world is executed.

While the preferred embodiments of the present invention have been described using specific terms, such description is for illustrative purposes only, and it is to be understood that changes and variations may be made without departing from the spirit or scope of the appended claims.

As described and according to the invention, a conversation support system and a conversation support method are provided that allow two or more users to simultaneously participate, for realtime communication, in a virtual world having a predetermined spatial expanse built on a computer network such as the Internet.

In addition, a conversation support system and a conversation support method are provided that allow users to communicate each other without making a face-to-face meeting in a shared virtual world having a spatial expanse built on a computer network.

Further, a conversation support system and a conversation support method are provided that allow users to communicate each other beyond a single shared virtual world.

Moreover, a conversation support system and a conversation support method are provided that allow users to communicate each other even if one of users between whom communication is to be established is not in a shared virtual world having a spatial expanse built on a computer network.

What is claimed is:

1. A conversation support system for supporting a plurality of users in having a virtual conversation in a shared virtual space built and provided on a computer network, comprising:
    enrolling means for enrolling an avatar of a logged-in user into said shared virtual space;
    imparting means for imparting a virtual mobile telephone to each avatar in said shared virtual space, said virtual mobile telephone being usable within said shared virtual space;
    determination means for determining, in response to a call to a virtual mobile telephone, whether a calling party originated said call from a telephone in said shared virtual space, (2) from a telephone in another virtual space, or (3) from a telephone in the real world; and
    connecting means for executing connection processing in accordance with the determination made by said determination means.

2. The conversation support system according to claim 1, wherein, if the determination means determines that said calling party originated said call from said telephone in the real world, said connecting means establishes a connection with said calling party through a public telephone network in the real world or executes message transfer.

3. The conversation support system according to claim 1, wherein, if the determination means determines that said calling party originated said call from said telephone in said another virtual space, said connecting means establishes a connection with said telephone in said another virtual space or executes message transfer.

4. The conversation support system according to claim 1, wherein said connecting means receives said call from said telephone in the real world or a virtual telephone in said another virtual space and connects the received call to a virtual mobile telephone of a called avatar in said shared virtual space.

5. A conversation support system for supporting a plurality of users in having a virtual conversation in a shared virtual space built and provided on a computer network, comprising:
    enrolling means for enrolling an avatar of a logged-in user into said shared virtual space;
    imparting means for imparting a virtual public telephone usable by any enrolled avatar to said shared virtual space at a predetermined place;
    determination means for determining, in response to a call to said virtual public telephone, whether a calling party originated said call (1) from a telephone in said shared virtual space, (2) from a telephone in another virtual space, or (3) from a telephone in the real world; and
    connecting means for executing connection processing in accordance with the determination made by said determination means.

6. The conversation support system according to claim 5, wherein, if the determination means determines that said calling party originated said call from said telephone in the real world, said connecting means establishes a connection with said calling party through a public telephone network in the real world or executes message transfer.

7. The conversation support system according to claim 5, wherein, if the determination means determines that said caller originated said call from said telephone in said another virtual space, said connecting means establishes a connection with said telephone in said another virtual space or executes message transfer.

8. A conversation support method for supporting a plurality of users in having a virtual conversation in a shared virtual space built and provided on a computer network, comprising:
    enrolling an avatar of a logged-in user into said shared virtual space;
    imparting a virtual mobile telephone to each avatar in said shared virtual space, said virtual mobile telephone being usable within said shared virtual space;
    determining, in response to a call to a virtual mobile telephone, whether a calling party originated said call from a telephone in said shared virtual space, (2) from a telephone in another virtual space, or (3) from a telephone in the real world; and
    executing connection processing in accordance with the determination made in said determination step.

9. The conversation support method according to claim 8, wherein, if the determining step determines that said calling party originated said call from said telephone in the real world, said connecting step establishes a connection with said calling party through a public telephone network in the real world or executes message transfer.

10. The conversation support method according to claim 8, wherein, if said determining step determines that said calling party originated said call from said telephone in said another virtual space, said connecting step establishes a connection with said telephone in said another virtual space or executes message transfer.

11. The conversation support method according to claim 8, further comprising:
- receiving a call from said telephone in the real world or said telephone in said another virtual space;
- determining whether said call is directed to an avatar existing in said shared virtual space; and
- if said determining step determines that said call is directed to said avatar existing in said shared virtual space, connecting said call to a virtual telephone of said avatar.

12. A conversation support method for supporting a plurality of users in having a virtual conversation in a shared virtual space built and provided on a computer network, comprising:
- enrolling an avatar of a logged-in user into said shared virtual space;
- imparting a virtual public telephone usable by any enrolled avatar to said shared virtual space at a predetermined place;
- determining, in response to a call to said virtual public telephone, whether a calling party originated said call from a telephone in said shared virtual space, (2) from a telephone in another virtual space, or (3) from a telephone in the real world; and
- executing connection processing in accordance with the determination made in said determination step.

13. The conversation support method according to claim 12, wherein, if the determining step determines that said calling party originated said call from said telephone in the real world, said connecting step establishes a connection with said calling party through a public telephone network in the real world or executes message transfer.

14. The conversation support method according to claim 12, wherein, if the determining step determines that said calling party originated said call from said telephone in said another virtual space, said connecting step establishes a connection with said telephone in said another virtual space or executes message transfer.

15. A conversation support method for supporting an activity of an avatar in a shared virtual space built and provided on a computer network, comprising:
- receiving a request for sending a message from a telephone of a user in the real world through a public telephone network in the real world, wherein the user is not logged into the shared virtual space;
- determining whether a destination of said message exists in said shared virtual space; and
- if said determining step determines that the destination of said message exists in said shared virtual space, sending said message to said avatar.

16. A program storage medium storing a computer program in a computer-readable form for executing processing on a computer system to support a virtual conversation in which a plurality of users can participate in a shared virtual space built and provided on a computer network, said computer program comprising the steps of:
- enrolling an avatar of a logged-in user into said shared virtual space;
- imparting a virtual public telephone usable by any enrolled avatar to said shared virtual space at a predetermined place;
- determining, in response to a call to said virtual public telephone, whether a calling party originated said call from a telephone in said shared virtual space, (2) from a telephone in another virtual space, or (3) from a telephone in the real world; and
- executing connection processing in accordance with the determination made in said determination step.

17. A program storage medium storing a computer program in a computer readable form for executing processing on a computer system to support a virtual conversation in which a plurality of users can participate in a shared virtual space built and provided on a computer network, said computer program comprising the steps of:
- receiving a request for sending a message from a telephone of a user in the real world through a public telephone network in the real world, wherein the user is not logged into the shared virtual space;
- determining whether a destination of said message exists in said shared virtual space; and
- if said determining step determines that the destination of said message exists in said shared virtual space, sending said message to an avatar.

* * * * *